United States Patent
Lv

(10) Patent No.: US 9,219,423 B2
(45) Date of Patent: Dec. 22, 2015

(54) CONVERTER BRIDGE ARM SUITABLE FOR HIGH-VOLTAGE APPLICATIONS AND APPLICATION SYSTEM THEREOF

(71) Applicant: Yao Lv, Hangzhou (CN)

(72) Inventor: Yao Lv, Hangzhou (CN)

( * ) Notice: Subject to any disclaimer, the term of this patent is extended or adjusted under 35 U.S.C. 154(b) by 0 days.

(21) Appl. No.: 14/352,947

(22) PCT Filed: Sep. 21, 2012

(86) PCT No.: PCT/CN2012/081758
§ 371 (c)(1),
(2) Date: Apr. 18, 2014

(87) PCT Pub. No.: WO2013/056614
PCT Pub. Date: Apr. 25, 2013

(65) Prior Publication Data
US 2014/0268888 A1    Sep. 18, 2014

(30) Foreign Application Priority Data
Oct. 18, 2011    (CN) .......................... 2011 1 0316845

(51) Int. Cl.
*H02M 5/22* (2006.01)
*H02M 1/088* (2006.01)
*H02M 7/483* (2007.01)

(52) U.S. Cl.
CPC .............. *H02M 5/225* (2013.01); *H02M 1/088* (2013.01); *H02M 2007/4835* (2013.01)

(58) Field of Classification Search
CPC ............................... H02M 1/088; H02M 5/225
USPC .................... 363/34, 35, 37, 65, 68, 131, 132
See application file for complete search history.

(56) References Cited

U.S. PATENT DOCUMENTS

2009/0196082 A1*    8/2009    Mazumder et al. ........... 363/132

FOREIGN PATENT DOCUMENTS

| CN | 101867313 | 10/2010 |
|---|---|---|
| CN | 101919152 | 12/2010 |

(Continued)

OTHER PUBLICATIONS

Nabae et al., "A New Neutral-Point-Clamped PWM Inverter", IEEE Transactions on Industry Applications, vol. 17. No. 5, 1981, pp. 518-523.

(Continued)

*Primary Examiner* — Jue Zhang
*Assistant Examiner* — Kyle J Moody
(74) *Attorney, Agent, or Firm* — Hamre, Schumann, Mueller & Larson, P.C.

(57) ABSTRACT

A converter bridge arm suitable for high-voltage applications and an application system thereof. The converter bridge arm comprises an energy storage capacitor (C) and a plurality of reverse-conducting switches, and is formed by serial connection of an upper telescopic arm (Bu), a lower telescopic arm (Bd) and an inductor (Lb). The upper telescopic arm (Bu) and the lower telescopic arm (Bd) are respectively formed by cascading connection of a plurality of units. The converter bridge arm has a simple modular structure, is easy to control, reliable and convenient for starting a high-voltage circuit, has self-balancing voltage sharing effect, and can operate without a transformer and has the characteristic of power bidirectional flow, does not require high-voltage isolation auxiliary power supply, has the advantages of suitability for high-frequency operation and electromagnetic compatibility, and can remarkably reduce the dimension of a filter.

16 Claims, 9 Drawing Sheets

(56) References Cited

FOREIGN PATENT DOCUMENTS

| CN | 2011-24391 | 2/2011 |
| CN | 101964596 | 2/2011 |
| CN | 102377324 | 3/2012 |
| CN | 102427352 | 4/2012 |
| JP | 5277096 | * 2/2011 |

OTHER PUBLICATIONS

Meynard et al., "Multi-level conversion: high voltage choppers and voltage-source inverters," Power Electronics Specialists Conference, 1992. PESC '92 Record, 23rd Annual IEEE, pp. 397-403.

Peng, "A generalized multilevel inverter topology with self voltage balancing," Industry Applications Conference, 2000. Conference Record of the 2000 IEEE, pp. 2024-2031.

Marchesoni et al., "A non conventional power converter for plasma stabilization," Power Electronics Specialists Conference, 1988. PESC '88 Record, 19th Annual IEEE, pp. 122-129.

Lesnicar et al. "An innovative modular multilevel converter topology suitable for a wide power range," Power Tech Conference Proceedings, 2003 IEEE Bologna (6 pages total).

Fan Zhang, "Research on Key Aspects in Integrated Power Electronics Modules for High Power Applications," Abstract of PhD Dissertation on Power Electronics, 2006, Zhejiang University, China (2 pages total).

* cited by examiner

CONVERTER BRIDGE ARM SUITABLE FOR HIGH-VOLTAGE APPLICATIONS AND APPLICATION SYSTEM THEREOF

TECHNICAL FIELD

The present invention relates to power system control technologies, in particular to a converter bridge arm suitable for high-voltage applications and an application system thereof. The present invention is mainly applied in smart grids (e.g. ultrahigh voltage power transmission, AC-DC-AC conversion power electronic transformers, and high-voltage grid-connected power generation of new energies), high-power electrical drive (high-voltage, medium-voltage variable frequency drive), and electric traction.

BACKGROUND

High-voltage high-power converters have always been a key technology for the application of power electronics in power systems and high-power electrical drive. A switch series connection technology or a multilevel technology must be employed in the case that the voltage required in practical applications exceeds the withstanding voltage of a single power semiconductor device. The withstanding voltage of conventional high-voltage power semiconductor devices is approximately 1-5 kV, and among them, those ordinary devices IGBT that are commonly used only have a withstanding voltage of 1200V approximately. Thus, use of a device having a withstanding voltage of 3400V could lead to much higher cost than use of those conventional high-voltage power semiconductor devices; even if a device having a higher withstanding voltage is used regardless of its cost, the high-voltage operating requirements of a power system cannot still be met without using the switch series connection technology or the multilevel technology. On the other hand, continuous improvement of the withstanding voltage level of these devices makes it possible that switching frequency becomes lower and lower, thereby increasing the volume and weight of a converter system.

For a high-voltage converter circuit, direct series connection of devices is the last resort. This scheme indeed brings the advantage of a relatively simple structure, but an extremely high change rate in switching voltage could still lead to the problems in the aspect of electromagnetic compatibility, and also degrade the reliability of load equipment and shorten the service life thereof. Furthermore, the voltage sharing control method for devices will be more difficult as the number of series connections rises, and requires a larger withstanding voltage margin, therefore, it can be concluded that the switch series connection technology is unsuitable for independent use in the power system.

As a result, it stands to reason that a multilevel circuit is used in the converter. The multilevel circuit can be applied to DC/AC, DC/DC, AC/DC and AC/AC, and for ease of description, illustration is mainly made below from an inversion (i.e. DC/AC) view.

(1) Power Switch

Reverse conducting switch is commonly used in a voltage source converter, and it may be composed of two independent devices: power semiconductor switch and antiparallel power diode and may also be an integrated device; for simplicity, it is herein referred to as switch (K, its symbol is shown in the circuit of FIG. 3), and the positive and negative poles of the switch are in directions that are just opposite to the polarities of the antiparallel power diode. K that is commonly used includes insulated gate bipolar transistor (IGBT) and power metal-oxide-semiconductor field effect transistor (Power MOSFET) device with the antiparallel power diode, and may also be thyristor, integrated gate commutated thyristor (IGCT), junction field effect transistor (Power JFET), and other novel devices like various types of silicon carbide power switches. In the circuit of FIG. 10, Power MOSFET is applied in K. A combined switch, which is formed by series connection of a plurality of reverse conducting switches, can still be perceived as a switch in the present invention.

(2) Several Important Multilevel Converter Circuits that Exist at Present

The first circuit: diode clamped multilevel circuit, which was first seen in the IEEE IAS conference paper (A. Naba) in 1980;

The second circuit: flying capacitor damped multilevel circuit, which was first seen in the IEEE PESC annual meeting paper (T. A. Meynard) in 1992;

The third circuit: unified clamped multilevel circuit, which was first seen in the IEEE IAS conference paper (F. Z. Peng) in 2000;

The fourth circuit: cascade multilevel circuit, which was first seen in the PESC conference paper (M. Marcheson) in 1988.

The first and second circuits have the major problem that: the complexity of these circuits is rapidly raised due to increase of the level number, the number of components and devices times fast (the former is switch devices and clamped diodes, and the latter is clamped capacitors); more seriously, impact from distributed inductance and control difficulty are also increased remarkably; in fact, applications of seven levels or above are rarely seen.

The third circuit has the major problem that increase of the level number results in faster rise of the number of components and devices in this circuit than the previous two circuits, and this circuit has not been put into practical application in industry yet. As a matter of fact, the third circuit is only theoretically meaningful, and the previous two circuits are special cases of the third circuit, respectively.

The foregoing shortcomings in the first, second and third circuits are not found in the fourth circuit; this circuit is capable of voltage balancing by means of an independent power source, is easy to realize modularization (H-bridge is served as unit module) and has been widely applied in medium-voltage variable frequency conversion, and its alternating current voltage is within 10 kV in general. Typically, a set of independent power source needs to be provided for every unit in the fourth circuit, so a quite complex structure of the main transformer of the apparatus is caused, which further places a limitation upon further rise of the level number.

In the field of reactive applications (e.g. one of the flexible power transmission devices for power system: STATCOM), the fourth circuit is free from the limitation of multiple paths of independent power sources, however, with the increase of the level number, there are still great challenges in voltage sharing problems.

(3) The Fifth Circuit, Balance Cascade Multilevel Converter

It is also known as "self-balance cascade multilevel", its capability of realizing automatic voltage sharing of the converter units is the most prominent feature of the new circuit and was made public in the doctoral thesis of Zhejiang University (F. Zhang) 2006, and in fact, this circuit is a variant of the third circuit. However, this circuit also has a few problematic issues: low-voltage power supply and high-voltage output, so it is unsuitable for common high-voltage applications; energy needs to be transferred among units many times, making efficiency a great problem; during balance actions, there is no restriction mechanism for balancing current impact; and all circuit elements needs to be closely connected as a whole, causing a large difficulty in achieving modular combined manufacturing.

(4) The Sixth Circuit, Modular Multilevel Converter (MMC)

This circuit was first seen in the IEEE PowerTech Conference paper (A. Lesnicar and R. Marquardt) in 2003 The number of devices required in this circuit is linearly proportional to the level number, and this circuit is also suitable for modular manufacturing and particularly for ultrahigh-voltage applications (e.g. HVDC Light) in power system, however, voltage sharing control for its modules is still quite problematic, so its practical applications are rarely seen.

SUMMARY OF THE INVENTION

Like symbols in this disclosure refer to like electronic elements and/or connecting terminals. Given the advantages and disadvantages of the multilevel circuits above, the present invention proposes a free telescopic arm-based multilevel converter topology and various converter circuits formed therefrom in accordance with the special requirements of high-voltage high-power converter systems and by reference to the crawling bionics principle of silkworm, and in such circuits, the problems of modularization implementation and electric stress balancing among modules are taken into full consideration.

The body of silkworm is made up of many segments, silkworm needs to constantly shrink and stretch its body during a crawling process. It is easy to find that there is a change in the thickness of every segment instead of the volume during the shrinkage and stretching of silkworm. The converter bridge arm that acts as bionic target can be considered as a pair of connected silkworms, the upper and lower two telescopic arms are respectively corresponding to one of the silkworms, and each converter unit in the telescopic arms is corresponding to one segment of silkworm body.

Regulation for the neutral point potential of the bridge arm is achieved by regulating the switches in the converter units of the telescopic arms, and during this regulation process, the energy storage level of each unit does not change suddenly, but the terminal voltage of the unit can change fast. In the event that the terminal voltage (obtained by series overlap of the terminal voltages of a plurality of units) and the energy of the telescopic arm are corresponding to the length and volume of silkworm respectively, it can be seen that regulation for the neutral point potential is quite like silkworm's telescopic action and the regulation process is just like shrinkage or stretching of the telescopic arm. Change of the neutral point is promoted by complementary shrinkage or stretching of the two telescopic arms together. And based on this principle, a brand-new high-voltage converter circuit can be constructed.

The sixth circuit above is actually a topology that is in conformity with this telescopic arm concept, but in the MMC circuit, only a half-bridge circuit is used as the converter units, so the circuit cannot realize automatic voltage sharing for the units and cannot be used in an AC/AC converter circuit either.

To solve the technical problems, provided in the present invention is a converter bridge arm suitable for high-voltage applications, which includes an energy storage capacitor C and a plurality of reverse conducting switches; the converter bridge arm is formed by series connection of an upper telescopic arm Bu, a lower telescopic arm Bd and an inductor(s) Lb, wherein the upper telescopic arm Bu and the lower telescopic arm Bd are respectively formed by cascading connection of a plurality of symmetrical units.

The symmetrical unit is composed of a first switch K1, a second switch K2, a third switch K3, a fourth switch K4 and an energy storage capacitor C; wherein, the first switch K1 and the second switch K2 as well as the third switch K3 and the fourth switch K4 are connected in series respectively; the positive terminal of the first switch K1 is connected with the positive terminal of the third switch K3 to serve as a positive terminal p* of the unit, and the negative terminal of the second switch K2 is connected with the negative terminal of the fourth switch K4 to serve as a negative terminal n* of the unit; the energy storage capacitor C is connected between the positive terminal p* and the negative terminal n*; the junction between the first switch K1 and the second switch K2 is a second cascading connection terminal Z12 of the unit, and the junction between the third switch K3 and the fourth switch K4 is a fourth cascading connection terminal Z22 of the unit.

The cascading connection mode of the plurality of symmetrical units is as follows: between two adjacent units, the fourth cascading connection terminal Z22 of the former unit is connected with the second cascading connection terminal Z12 of the latter unit;

The upper and lower terminals of the bridge arm are terminals P and N of the bridge arm, respectively;

In the units at the outer sides of the two ends of the upper telescopic arm Bu and the lower telescopic arm Bd, the positive terminals p* and the negative terminals n* are led out to serve as auxiliary terminals of the converter bridge arm; the second cascading connection terminal Z12 is taken as terminal p and the fourth cascading connection terminal Z22 is taken as terminal n, and the terminals p and n are arranged in a direction consistent with the terminals P and N of the converter bridge arm;

The neutral point of the bridge arm, i.e. terminal Ac, is led from the connection wire between the terminal n of the upper telescopic arm Bu and the terminal p of the lower telescopic arm Bd; and the inductor(s) Lb is(are) any of the following forms:

(1) There is one inductor Lb, which is located at any position of the series connection branch of the upper telescopic arm Bu and the lower telescopic arm Bd;

(2) There are two inductors Lb, which are respectively located at the two sides of the terminal Ac on the series connection branch of the upper telescopic arm Bu and the lower telescopic arm Bd; and (3) There are a plurality of inductors Lb, which are respectively located in the various symmetrical units.

As an application of the foregoing converter bridge arm, the present invention proposes that: an AC voltage regulator is composed of one or a plurality of converter bridge arms;

In the case that the AC voltage regulator is composed of one converter bridge arm, the terminals P and N of the converter bridge arm constitute an alternating current port and the terminals Ac and N constitute another alternating current port, in this way, a single-phase electronic voltage regulator is formed; or, In the case that the AC voltage regulator is composed of a plurality of converter bridge arms, a multiphase alternating current port is led from the terminals P and N of each of the converter bridge arms in accordance with a polygon or star connection method, and another multiphase alternating current port is led from the terminal Ac of each of the converter bridge arms, in this way, a multiphase AC/AC electronic voltage regulator is formed.

On the basis of the same implementation principle, the present invention proposes a modified converter bridge arm, which includes an energy storage capacitor C and a plurality of reverse conducting switches; the converter bridge arm is formed by series connection of an upper telescopic arm Bu, a lower telescopic arm Bd and an inductor(s) Lb, wherein the upper telescopic arm Bu and the lower telescopic arm Bd are respectively formed by cascading connection of a plurality of units; and the unit is any one or two of the balance asymmetrical unit or the balance symmetrical unit;

The balance asymmetrical unit is composed of: a first switch K1, a second switch K2, a third switch K3, a fourth switch K4 and an energy storage capacitor C; wherein, the first switch K1 and the second switch K2 as well as the third switch K3 and the fourth switch K4 are connected in series respectively; the positive terminal of the first switch K1 is connected with the positive terminal of the third switch K3 to serve as a positive terminal p* of the unit, and simultaneously, this terminal is also a first cascading connection terminal Z11 of the unit; the negative terminal of the second switch K2 is connected with the negative terminal of the fourth switch K4 to serve as a negative terminal n* of the unit, and simultaneously, this terminal is also a fourth cascading connection terminal Z22 of the unit; the two terminals of the energy storage capacitor C are connected with the first cascading connection terminal Z11 and the fourth cascading connection terminal Z22, respectively; the junction between the first switch K1 and the second switch K2 is a second cascading connection terminal Z12 of the unit, and the junction between the third switch K3 and the fourth switch K4 is a third cascading connection terminal Z21 of the unit.

The balance symmetrical unit is composed of: a first switch K1, a second switch K2, a third switch K3, a fourth switch K4, a fifth switch K5, a sixth switch K6, a seventh switch K7, an eighth switch K8 and an energy storage capacitor C; wherein, the first switch K1 is connected with the second switch K2 in series, and the junction therebetween is a first cascading connection terminal Z11 of the unit; the third switch K3 is connected with the fourth switch K4 in series, and the junction therebetween is a third cascading connection terminal Z21 of the unit; the fifth switch K5 is connected with the sixth switch K6 in series, and the junction therebetween is a second cascading connection terminal Z12 of the unit; the seventh switch K7 is connected with the eighth switch K8 in series, and the junction therebetween is a fourth cascading connection terminal Z22 of the unit; the positive terminals of the first switch K1, the third switch K3, the fifth switch K5 and the seventh switch K7 are connected to serve as a positive terminal p* of the unit, and the negative terminals of the second switch K2, the fourth switch K4, the sixth switch K6 and the eighth switch K8 are connected to serve as a negative terminal n* of the unit and the two terminals of the energy storage capacitor C are connected with the positive terminal p* and the negative terminal n*, respectively;

The cascading connection mode of the plurality of units is as follows: a connection relationship of two groups of cascading connection terminals exists between two adjacent units, which is specifically as follows: the third cascading connection terminal Z21 of the former unit is connected with the first cascading connection terminal Z11 of the latter unit, and the fourth cascading connection terminal Z22 of the former unit is connected with the second cascading connection terminal Z12 of the latter unit; wherein, connection of one group of cascading connection terminals is implemented through an inductor Ls or a resistor R or through a parallel circuit of the inductor Ls and the resistor R, and connection of the other group of cascading connection terminals is implemented in a direct way;

In the units at the outer sides of the two ends of the upper telescopic arm Bu and the lower telescopic arm Bd, the positive terminals p* and the negative terminals n* are led out to serve as auxiliary terminals of the converter bridge arm; the second cascading connection terminal Z12 is taken as terminal p and the fourth cascading connection terminal Z22 is taken as terminal n, and the terminals p and n are arranged in a direction consistent with the terminals P and N of the converter bridge arm:

The neutral point of the bridge arm, i.e. terminal Ac, is led from the connection wire between the terminal n of the upper telescopic arm Bu and the terminal p of the lower telescopic arm Bd; and the inductor(s) Lb is(are) any of the following forms:

(1) There is one inductor Lb, which is located at any position of the series connection branch of the upper telescopic arm Bu and the lower telescopic arm Bd;

(2) There are two inductors Lb, which are respectively located at the two sides of the terminal Ac on the series connection branch of the upper telescopic arm Bu and the lower telescopic arm Bd; and (3) There are a plurality of inductors Lb, which are respectively located in the various symmetrical units.

As another modified converter bridge arm, the telescopic arm is formed by cascading connection of the balance asymmetrical units; in two adjacent units, one of the fourth switch K4 of the former unit and the first switch K1 of the latter unit is replaced by a diode, and the diode has the same polarities as those of the reverse conducting diodes in the replaced switch.

As another modified converter bridge arm, the telescopic arm is formed by cascading connection of the balance symmetrical units; in two adjacent units, one or two of the seventh switch K7, the eighth switch K8 of the former unit and the fifth switch K5, the sixth switch K6 of the latter unit are replaced by diodes, and the two switches in the same unit cannot be replaced by diodes at the same time; the diode has the same polarities as those of the reverse conducting diodes in the replaced switches.

As another modified converter bridge arm, the telescopic arm is formed by cascading connection of the balance symmetrical units; in two adjacent units, one or two of the seventh switch K7, the eighth switch K8 of the former unit and the fifth switch K5, the sixth switch K6 of the latter unit are replaced by diodes, and the two switches in the same unit cannot be replaced by diodes at the same time; the diode has the same polarities as those of the reverse conducting diodes in the replaced switches.

Simultaneously, the wire connection mode of the fifth switch K5, the sixth switch K6, the seventh switch K7 or the eighth switch K8 replaced by the diodes is changed: the positive terminal of the fifth switch K5 and the negative terminal of the sixth switch K6 are connected to the second cascading connection terminal Z12, and the positive terminal of the seventh switch K7 and the negative terminal of the eighth switch KB are connected to the fourth cascading connection terminal Z22; this change in connection only falls upon the diodes for replacement, not upon the non-replaced switches; and the positive and negative terminals described herein refer to the polarities of the original switches before replacement, not the polarities of the diodes after replacement.

As another modified converter bridge arm, the telescopic arm is formed by cascading connection of the balance asymmetrical units; in two adjacent units, the third cascading connection terminal Z21 of the former unit is directly connected with the first cascading connection terminal Z11 of the latter unit, and the fourth cascading connection terminal Z22 of the former unit is directly connected with the second cascading connection terminal Z12 of the latter unit; and one of the fourth switch K4 of the former unit and the first switch K1 of the latter unit is omitted.

As another modified converter bridge arm, the telescopic arm is formed by cascading connection of the balance symmetrical units; in two adjacent units, the third cascading connection terminal Z21 of the former unit is directly connected with the first cascading connection terminal Z11 of the latter unit, and the fourth cascading connection terminal Z22 of the former unit is directly connected with the second cascading connection terminal Z12 of the latter unit; one of the seventh switch K7 of the former unit and the fifth switch K5 of the latter unit is omitted; and one of the eighth switch KB of the former unit and the sixth switch K6 of the latter unit is omitted.

As another modified converter bridge arm, adopted between the terminal n unit of the upper telescopic arm Bu and the terminal p unit of the lower telescopic arm Bd is double-wire connection, which is specifically as follows: the fourth cascading connection terminal Z22 of the terminal n unit is directly connected with the second cascading connection terminal Z12 of the terminal p unit, and connection of the third cascading connection terminal Z21 of the terminal n unit and the first cascading connection terminal Z11 of the terminal p unit is implemented through an inductor Ls or a resistor R or through a parallel circuit of the inductor Ls and the resistor R.

As another modified converter bridge arm, the cascading connection mode of the plurality of units is replaced by the followings: a connection relationship of two groups of cascading connection terminals exists between two adjacent units, which is specifically as follows: the third cascading connection terminal Z21 of the former unit is connected with the first cascading connection terminal Z11 of the latter unit through an inductor Ls1, and the fourth cascading connection terminal Z22 of the former unit is connected with the second cascading connection terminal Z12 of the latter unit through an inductor Ls2; any of the following four relationships exists between the inductor Ls1 and the inductor Ls2:

(1) Ls1 and Ls2 are separate inductors;

(2) Ls1 and Ls2 are coupled inductors, and magnetic fluxes of voltage Uc balanced current on the energy storage capacitor C are mutually enhanced in the two inductors;

(3) Ls1 and Ls2 are separate inductors, and one of the two inductors is connected with the resistor R in parallel; and (4) Ls1 and Ls2 are coupled inductors, magnetic fluxes of voltage Uc balanced current on the energy storage capacitor C are mutually enhanced in the two inductors, and one of the two inductors is connected with the resistor R in parallel.

As an application of the converter bridge arm, the present invention proposes that: the converter circuit has a conventional converter topology, and is characterized in that: the common bridge arm is replaced by the converter bridge arm, both the upper telescopic arm Bu and the lower telescopic arm 6d of the converter bridge arm are formed by cascading connection of the balance asymmetrical units, thus any of several following converter circuits is formed:

(1) A bidirectional DC/DC converter is composed of the converter bridge arm, the terminals P and N of the converter bridge arm are connected with the positive and negative terminals of one direct current source, and the terminal An of the converter bridge arm is connected with a filter inductor in series and then connected with the positive and negative terminals of another direct current source;

(2) A single-phase or multiphase DC/AC or AC/DC converter is composed of one or a plurality of converter bridge arms, the terminals P and N of the converter bridge arms are connected in parallel respectively to serve as direct current positive and negative terminals, and the terminals Ac of the converter bridge arms are alternating current terminals for various phases, respectively:

(3) A single-phase or multiphase back-to-back AC/DC/AC converter is composed of two or a plurality of converter bridge arms, the terminals P and N of the converter bridge arms are connected in parallel respectively to serve as direct current positive and negative terminals, the terminals Ac of the first group of converter bridge arms are connected with the various phases of a first alternating current source respectively, and the terminals Ac of the second group of converter bridge arms are connected with the various phases of a second alternating current source respectively.

As an application of the converter bridge arm, the present invention proposes that: the converter is a three-phase or multiphase converter formed by further connection of one or a plurality of telescopic arms on the converter bridge arm; and the converter is characterized in that, the telescopic arms as well as the upper telescopic arm Bu and the lower telescopic arm Bd in the converter bridge arm are all formed by cascading connection of the balance symmetrical units; the connection mode of the converter is any of the following connection modes:

(1) The terminals P and N of the converter bridge arm are connected with the two phases of a three-phase power source respectively, one end of the new telescopic arm is connected with the terminal Ac of the converter bridge arm, while the other end is connected with the remaining phase of the three-phase power source, in this way, a star converter is formed; a star multiphase converter is formed by further increasing the number of the telescopic arms; or (2) The terminals P and N of the converter bridge arm are connected with the new telescopic arm in parallel and connected with the two phases of the three-phase power source respectively, the terminal Ac of the converter bridge arm is connected with the remaining phase of the three-phase power source, in this way, a triangle converter is formed; and a polygon multiphase converter is formed by connecting a plurality of telescopic arms in series and then connecting these telescopic arms with the terminals P and N of the converter bridge arm in parallel.

As an application of the converter bridge arm, the present invention proposes that: the AC/AC converter has one or a plurality of converter bridge arms, and the circuit structure thereof is any of the following three structures:

(1) The terminals P and N of a single converter bridge atm are an alternating current port and the terminals Ac and N are another alternating current port, in this way, a single-phase AC/AC frequency converter is formed; or (2) A multiphase alternating current port is led from the terminals P and N of the converter bridge arms in accordance a polygon or star connection method, and another multiphase alternating current port is led from the terminals Ac of the converter bridge arms, in this way, a multiphase AC/AC frequency converter is formed; or (3) The terminals P and N of the first group of three converter bridge arms are connected with various input phases respectively in accordance with the triangle or star connection method, and the terminals P and N of the second group of three converter bridge arms are connected with various output phases respectively in accordance with the triangle or star connection method; the terminals Ac of the two groups of converter bridge arms are connected with primary and secondary windings of a three-phase medium-frequency transformer respectively, in this way, an electronic transformer is formed.

The present invention further proposes converter control method based on the foregoing converter bridge arm: terminal voltages Us of the units in the telescopic arms are controlled by regulating drive pulses of the switches, so as to control the terminal voltages Uu and Ud of the upper telescopic arm Bu and the lower telescopic arm Bd; an average current $I_{PN}$ passing between the terminals P and N of the converter bridge arm is controlled by dynamically regulating the sum of Uu and Ud, so as to control the average values of Uc of all the units in the converter bridge arm; regulation for potential at the terminal Ac is achieved by complementarily regulating Uu and Ud; distribution of the currents $I_P$ and $I_N$ of the upper telescopic arm Bu and the lower telescopic arm Bd is changed by dynamically regulating the relative magnitude of Uu and Ud, so as to balance the difference between the average values of Uc of the both; and the differences of Uc of the units in the telescopic arms are balanced by regulating the relative magnitude of the average values of voltage plateaus Us between the unit ports in the upper telescopic arm Bu and the lower telescopic arm Bd.

As an improved converter control method, one of the following four modes is adopted for the switch modulation pulse phase of the units:

(1) A control mode of identical pulse phase is adopt the units in the same telescopic arm; or (2) A control mode of phase-shift is adopted for the units in the same telescopic arm; or (3) SPWM modulation in which carriers are equally phase-shifted based upon angle of circumference is adopted for the units in the same telescopic arm, and carriers phases of the corresponding units between the upper telescopic arm Bu and the lower telescopic arm Bd are complemented; or (4) For a three-phase DC/AC, AC/DC converter formed by three bridge arms, six units, which are located at the same positions of the bridge arms, are grouped and controlled under a SVPWM mode, and modulated carriers of the units in the same telescopic arm are equally phase-shifted based upon angle of circumference.

Advantageous Effects and Innovations of the Present Invention

The present invention solves the problem that the complexity of most of the high-voltage multilevel circuits rises sharply along with increase of the level number, and also solves the problem that non-transformer cascade multilevel circuits can only be used for reactive conversion, but not for active conversion, such as high-voltage motor variable frequency drive; compared with transformer cascade multilevel circuits, supply of a multi-winding independent power source from the transformer is not needed in the present invention; and meanwhile, the present invention also solves the problem that balance cascade multilevel circuits fail to adapt to high-voltage input/output conversion at the same time.

The present invention has the advantages that:

(1) As the level number of the converter increases, the number of components and devices required therein increases linearly, but no significant increase is found in the aspect of circuit complexity.

(2) The modular circuit structure has good electromagnetic compatibility between the interior of the modules and the modules.

(3) A plurality of high-voltage bidirectional conversion functions, such as AC/DC, DC/AC, AC-DC-AC, DC/AC, AC/AC and the like, can be realized, and active and reactive conversion can be executed.

(4) The system is imparted with a unit voltage self-balancing function, and there are quite moderate design conditions for safety redundancy, so good safety and reliability are achieved.

(5) Input/output energy exchange is directly associated with the units, weakening macro transfer of the energy among the modules at all levels and improving the efficiency.

(6) The present invention, integrated with high-voltage and high-frequency properties, can accomplish an extremely high equivalent operating frequency, reduce electro-magnetic interference (EMI) noise from equipment remarkably, and greatly reduce the dimension of filter.

(7) Startup of the high-voltage circuit is very easy and convenient, so a special high-voltage pre-charging circuit is not needed.

(8) Auxiliary power supply can be readily acquired from the units themselves, so a high-voltage isolation auxiliary power source is not needed.

With the outstanding characteristics above, the present invention is suitable for medium-voltage, high-voltage, and even ultrahigh-voltage AC/DC, DC/AC, DC/DC conversion, can be widely applied to medium/high-voltage frequency conversion, power electronic transformers, direct grid-connected power generation of new energies and smart grid applications, and is particularly suitable for ultrahigh-voltage conversion applications in a power system.

DETAILED DESCRIPTION OF THE PREFERRED EMBODIMENTS

For a better convenience of reading, sequential numbers of the switches and the cascading connection terminals are omitted in description of the present invention hereinafter. However, their corresponding relationships could still be clearly and undoubtedly identified in accordance with the disclosure in this description and the accompanying drawings, and are kept highly consistent with the expression of the inventive content. Clarification is hereby made.

1.1 The Basic Principle of Telescopic Arms and Bridge Arm

The telescopic arms in the present invention are similar to common switches in the aspects of blocking voltage/current or direct conduction, e.g. the terminal voltages of the telescopic arm may be under a short-circuit or circuit-breaking state. Further, the telescopic arms have a voltage limiting feature, and when a telescopic arm is under a blocked state, blocking voltages exist at the two ends of the telescopic arm in case of forcible passage of currents. Voltage on the energy storage capacitor C is Uc. Voltage spike that is caused by stray parameters on the line can be naturally absorbed by C of the telescopic arm when the telescopic arm is blocked rapidly, suggesting that there is a quite excellent electromagnetic compatibility in the circuit.

The largest difference between telescopic arm and common switch is that voltages at the two ends of the telescopic arm are controllable through switch control, and may be the algebraic sum of Uc of a plurality of units; and if the switches of the various units are controlled under a PWM pulse mode, the average value of the terminal voltages of the telescopic arm may be regulated continuously.

Figure 1:
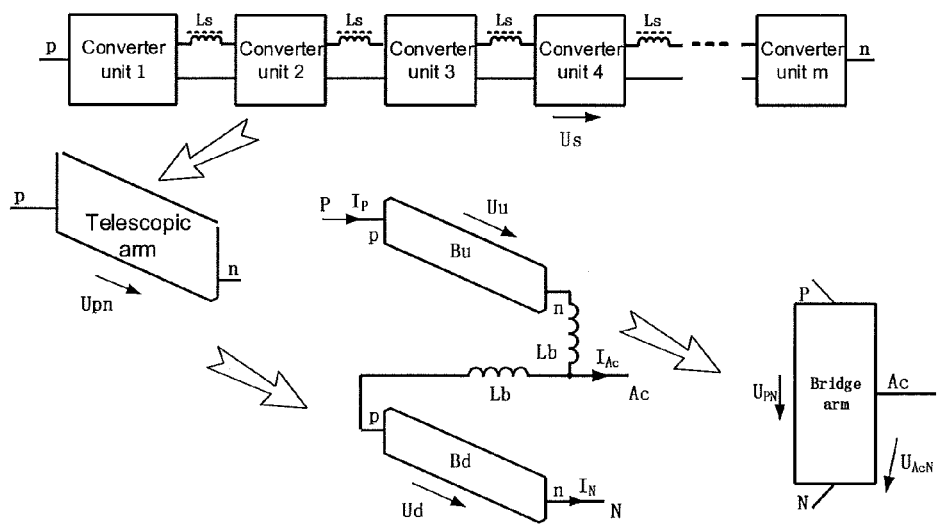
FIG. 1 illustrates the structure of the multilevel bridge arm.
Figure 3:
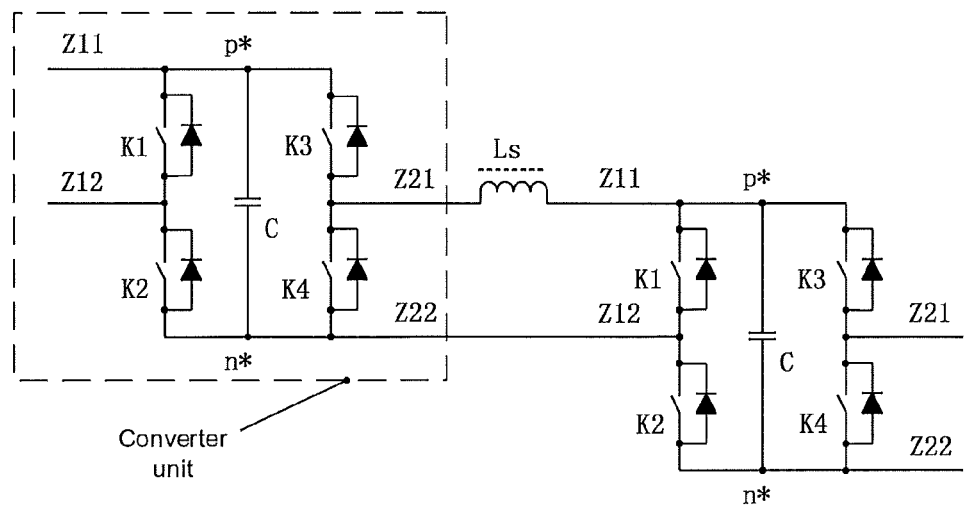
FIG. 3 illustrates the balance asymmetrical converter units and the connection thereof.
Figure 4:
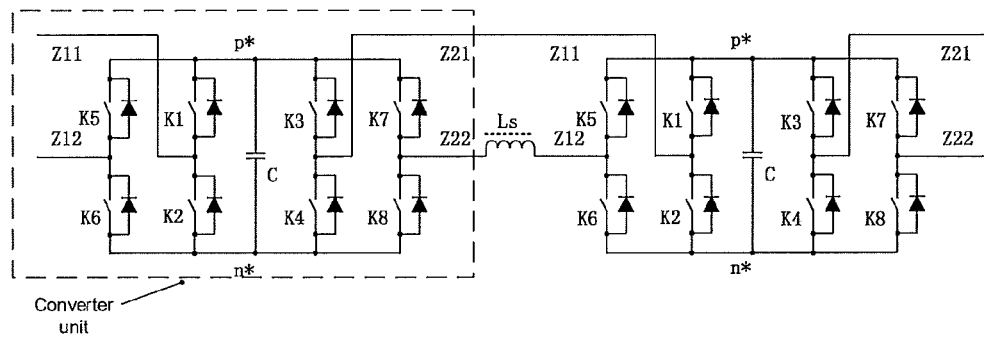
FIG. 4 illustrates the balance symmetrical converter units and the connection thereof.

The telescopic arm proposed in the present invention is formed by cascading connection of converter units. The so-called converter units include, for example, common topologies like BUCK, BOOST, BUCK-BOOST, half-bridge and full-bridge, as well as more complex topologies that are formed on this basis. Highlighted by the dotted boxes in FIG. 3 and FIG. 4 are all examples of the converter unit. The converter units form a single telescopic arm through cascading connection, e.g. the aforementioned fourth and fifth circuits (i.e. cascade multilevel and balance cascade multilevel) can be both considered as a telescopic arm. The procedure of the present invention that the telescopic arms composed of the units further form the bridge arm is shown in FIG. 1.

The two terminals P and N of the bridge arm are capable of withstanding voltage $U_{PN}$, the voltages that the telescopic arms Bu and Bd withstand are Uu and Ud respectively, and cascade voltage (Us, see FIG. 10) of the converter unit can be regulated through pulse control for the switches therein, thus voltage $U_{AcN}$ of the terminal Ac to the terminal N can be regulated. When asymmetrical converter units are adopted for the bridge arm, $U_{PN}$, Uu and Ud are forward voltages; and when symmetrical converter units are adopted for the bridge arm, all these voltages are allowed to be negative, i.e. the bridge arm and the telescopic arms have positive and negative symmetrical polarities. The telescopic arms, bridge arm and switches in the present invention are assumed to be arrayed in an upper-positive and lower-negative way, and this is for good convenience in principle description; and if their array is changed to be in an upper-negative and lower-positive way, the same functions will be achieved as well.

Figure 2:
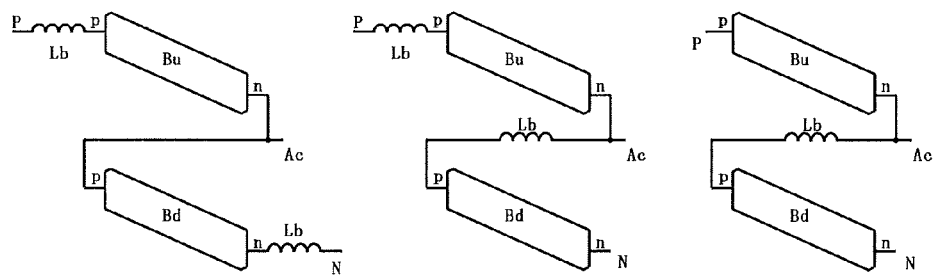
FIG. 2 illustrates the number and position of the inductors in the bridge arm.

To inhibit current impact and pulsation of the bridge arm during the regulation process, a series inductor Lb between Bu and Bd is indispensable, and this Lb may be disposed at any position on the series branch, or divided into two Lbs and then disposed at the two sides of Ac on the series branch respectively, and may also be divided into a plurality of inductors and then disposed in the converter units respectively. Differences in position and number of the series inductors only result in a tiny difference in circuit properties, but there is no essential difference in operating principle of the bridge arm itself, several examples are shown in FIG. 2. For such applications as motor drive, each bridge arm can operate with a single Lb because of inductors in motor load, and in case of general loads, two Lbs are still needed to smooth the currents on the terminals of the bridge arm.

Positive and negative terminals (p*, n*) are led from the units at the outer side of the telescopic arm to serve as auxiliary terminals for the bridge arm, and there are four pairs of auxiliary terminals in total as the bridge arm has two telescopic arms. For easiness in description, the bridge arm and the telescopic arms in the drawings are no longer drawn up one by one. These auxiliary terminals are for standby purposes, for example, a low-voltage power source can pre-charge the telescopic arm Uc through these auxiliary terminals during startup. These auxiliary terminals are ineffective in the telescopic arms composed of the symmetrical units and in the bridge arm.

The bridge arm of the present invention may take the place of common switches in various bridge circuits or similar circuits to form new circuits.

1.2 The Principle of Energy Balance of Telescopic Arms

Telescopic arm is essentially a switch for energy storage, and currents will cause change of Uc of the units in a telescopic arm as long as the telescopic arm is not under a short-circuit state. Therefore, those telescopic arms are used for the passage of alternating currents or pulse currents; passage of steady direct currents is not allowed except under the short-circuit state. The value of C in the units is determined on the premise of no significant change of Uc (e.g. not beyond 1-10%), this is associated with current magnitude, and in the case of alternating currents, this is also associated with frequency. Uc of the units in the telescopic arm should be basically kept unchanged during applications.

The current and voltage on the telescopic arm involve direct and alternating currents or pulses. To realize the function of conversion, the following conditions need to be met 1) periodical energy balance of the telescopic arm is maintained; and 2) the bridge arm is capable of meeting the input/output voltage relationship.

Based on the principles of electric and electronic engineering, active current is not generated from the current on the telescopic arm and the output alternating voltage in output regulation for DC/AC. And to achieve energy balance, larger currents ($I_N$, $I_p$) pass through the telescopic arm when there is a low voltage of the telescopic arm (i.e. shrinkage) and smaller reverse currents pass through the telescopic arm when there is a high voltage (i.e. stretching); what is related to this is the fact that the average current that passes through the telescopic arm will create a direct current and the value of this average current is multiplied by the input voltage of the bridge arm to obtain an input power of circuit.

In the case of AC/AC conversion and different input/output frequencies, alternating current voltage overlap components of these two frequencies are contained in the telescopic arm. A voltage and a current, which have different frequencies, will not generate active current according to the circuit theory, thus the requirement of maintaining periodical energy balance of the telescopic arm can be met as long as the active powers of the two frequencies, i.e. input/output frequencies, on the telescopic arm are zeroed respectively or mutually offset through regulation In the case of AC/AC conversion and identical input/output frequency (which is equal to the situation that a converter acts as the voltage regulator), in order to meet the requirement of maintaining periodical energy balance of the telescopic arm, active power caused by currents on the telescopic arm is required to be zero. There should be a difference of 90° for the voltage phase on the telescopic arm if only active currents related to $U_{PN}$ pass through the bridge arm, as a result, AC/AC conversion will be accompanied by phase shift of input/output voltages.

In the case of DC/DC conversion, the bridge arm cannot output a steady DC voltage in order to avoid accumulation of the energy of the telescopic arm. However, the bridge arm can still output pulse voltages, and it is assumed that the output voltage is $U_{AcNO}$ a voltage higher than $U_{AcNO}$ is output during the earlier stage of one period, a voltage lower than $U_{AcNO}$ is output during the later stage, and the average value of this whole period is determined as $U_{AcNO}$; larger bridge arm currents ($I_N$, $I_P$) pass through the bridge arm when $U_{AcN}$ is low and smaller reverse currents pass through the bridge arm when $U_{AcN}$ is high, in order to maintain periodical energy balance of the telescopic arm. Pulse-type DC/DC output can be changed into steady DC by means of filtering.

While filtering is still required in the foregoing AC/DC and AC/AC conversions, output ripples are typically pulsations at the magnitude of Uc and accordingly are easily filtered out. It is clear from the principle of DC/DC conversion of the bridge arm that, DC/AC conversion and AC/AC conversion may also operate under a pulse mode, and they will not necessarily be accompanied by phase shift of input/output voltages during use for an electronic voltage regulator. This pulse-mode operation has the shortcomings of large output pulse and the need of filtering enhancement.

Symbols Uu and Ud represent the terminal voltages of Bu and Bd respectively, and represents the voltage of the neutral point Ac to the terminal N in the bridge arm. $I_p$, $I_N$ and $I_{Ac}$ respectively represent the currents that pass through the terminals N and Ac of the bridge arm, and $I_{Ac}=I_p-I_N$; and $I_{PN}$ represents the average current that passes through the bridge arm, $I_{PN}=(I_p+I_N)/2$. Reference is made to FIG. 1.

If the terminals P and N of the bridge arm are connected to the positive and negative terminals of a direct current power source, then $Uu+Ud=U_{PN}$; the telescopic arm has the characteristic that voltages at the two ends thereof are rapidly changeable, while voltages Uc of the energy storage capacitors in the units of the telescopic arm are relatively steady; change of the terminal voltages Us of the units leads to change of $I_p$, $I_N$ and $I_{Ac}$, the existence of series inductors places a limitation upon the change rate of current, and the change of current will finally affect Uu, Ud and $U_{AcN}$.

Overall control for those parameters like $I_p$, $I_N$, $I_{Ac}$, Uu, Ud and $U_{AcN}$ is accomplished via multi-management in the present invention:

(1) Control for $I_{Pn}$ is accomplished by regulating the sum of Uu and Ud, e.g. $I_{PN}$ will increase if $Uu+Ud<U_{PN}$.

(2) During control for $U_{AcN}$, a complementary relationship needs to be kept between the regulations for Uu and Ud, that is to say, increase of Uu is basically equivalent to decrease of Ud, and only in this way can disturbances on the average current $I_{PN}$ passing through the bridge arm be avoided.

(3) $Ud=U_{AcN}$ and $Uu=U_{PN}-U_{AcN}$ during output balancing. Distribution of $I_p$ and $I_N$ can be changed by regulating the relative magnitude of Uu and Ud, so as to change the current $I_{Ac}$ at the terminal Ac. For example, if Ud increases and Uu decreases, then $Ud>U_{AcN}$ and $Uu<U_{PN}-U_{AcN}$. Accordingly, if $I_p$ decreases and $I_N$ increases, then $I_{Ac}$ decreases as well.

(4) The differences of Uc of the units can be balanced by regulating the relative magnitude of the terminal voltages (Us) of the units in the telescopic arm. In fact, for a bridge arm that is composed of asymmetrical units and balance symmetrical units, the differences of Uc of the units can be inhibited through the balancing function of this bridge arm; but excessive energy flow among the units can be reduced by regulating and balancing Uc of the units in a pulse way, in order to achieve the purpose of loss reduction.

In terms of energy, total energy of the bridge arm can be controlled only if $I_{PN}$ is controlled, which means the average value of Uc of all the converter units in the bridge arm is controlled; and the average values $I_P$ and $I_N$ of Uc Bu and Bd can be controlled respectively only if $I_P$ and $I_N$ are controlled.

For two of the above-mentioned control objects, only one can be selected. For example, only control for one of the control objects $U_{AcN}$ and $I_{Ac}$ can be realized, the former corresponds to the terminal Ac connected with an independent load (e.g. connected with a motor), and the latter corresponds to the terminal Ac connected with a voltage source (e.g. connected to a power grid). And this also applies to the relationships between Uu and Ud and between $I_P$ and $I_N$, so detailed description is not needed herein.

In the bridge arm of FIG. 1, there is only one connection wire between two telescopic arms and energy transfer between Bu and Bd is infeasible, which possibly results in too much change of Uc in Bu and Bd on the conditions of DC/DC, extremely low frequency, as well as the requirement on alternating frequency conversion under steady output. The change directions of Uc are opposite, so adoption of two-wire connection provides a channel for energy exchange between Bu and Bd, contributing to reduction of Uc change. And in this case, arrangement of the Lb inductors at the junction of Bu and Bd is inappropriate, and instead, they should be arranged at the terminals P and N to avoid disturbing energy exchange between Bu and Bd.

However, due to unequal currents Ip and $I_N$, macro energy transfer between the two telescopic arms is likely to be quite prominent sometimes, thereby increasing the loss of the converter. In some telescopic arms with two-wire connection between the units, this kind of situation seems to be much less prominent due to equal currents among the units of the same telescopic arm. Corresponding balance switches (e.g. K3 of each unit in FIG. 3, K5 and K7 of each unit in FIG. 4, etc.) in one unit can be shut off to reduce loss as long as those various units deviate from energy storage balance points in an acceptable way.

Figure 9:
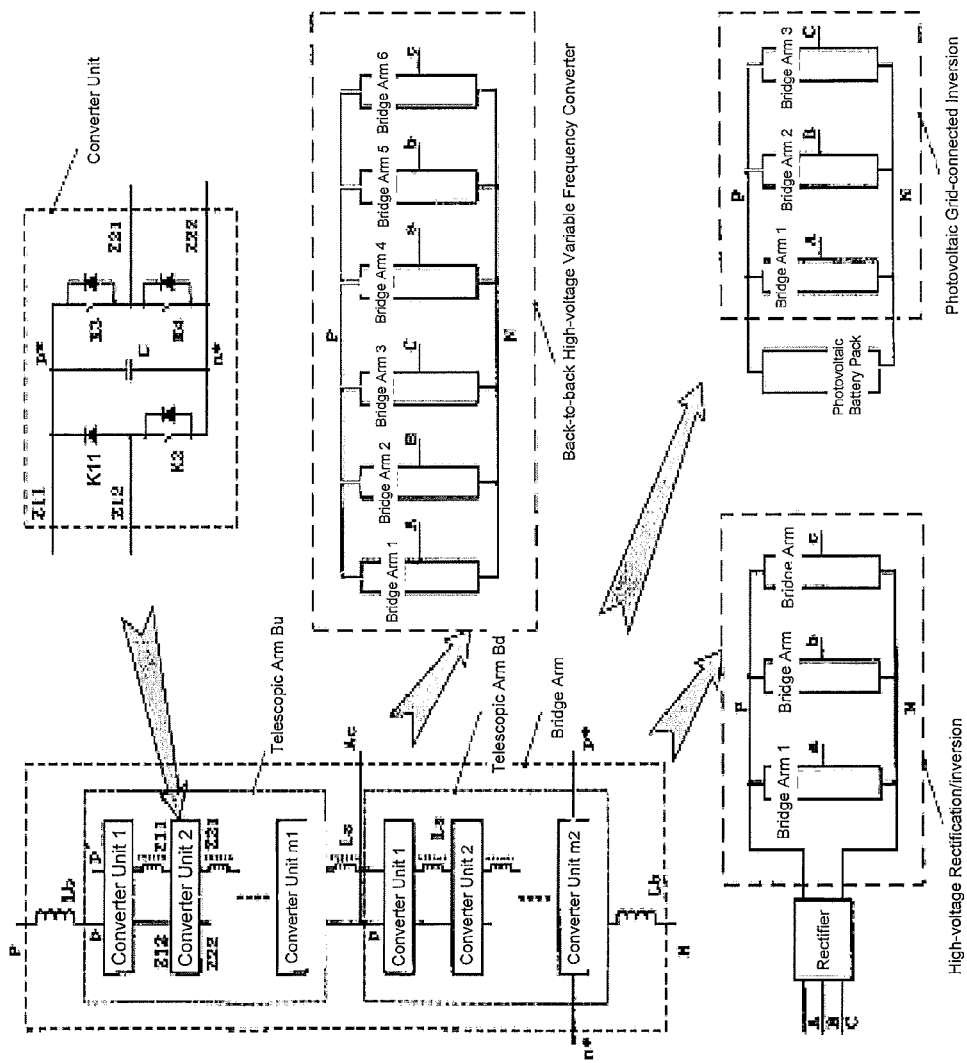
FIG. 9 illustrates a variety of alternating/direct current circuits composed of the balance asymmetrical units.
Figure 12:
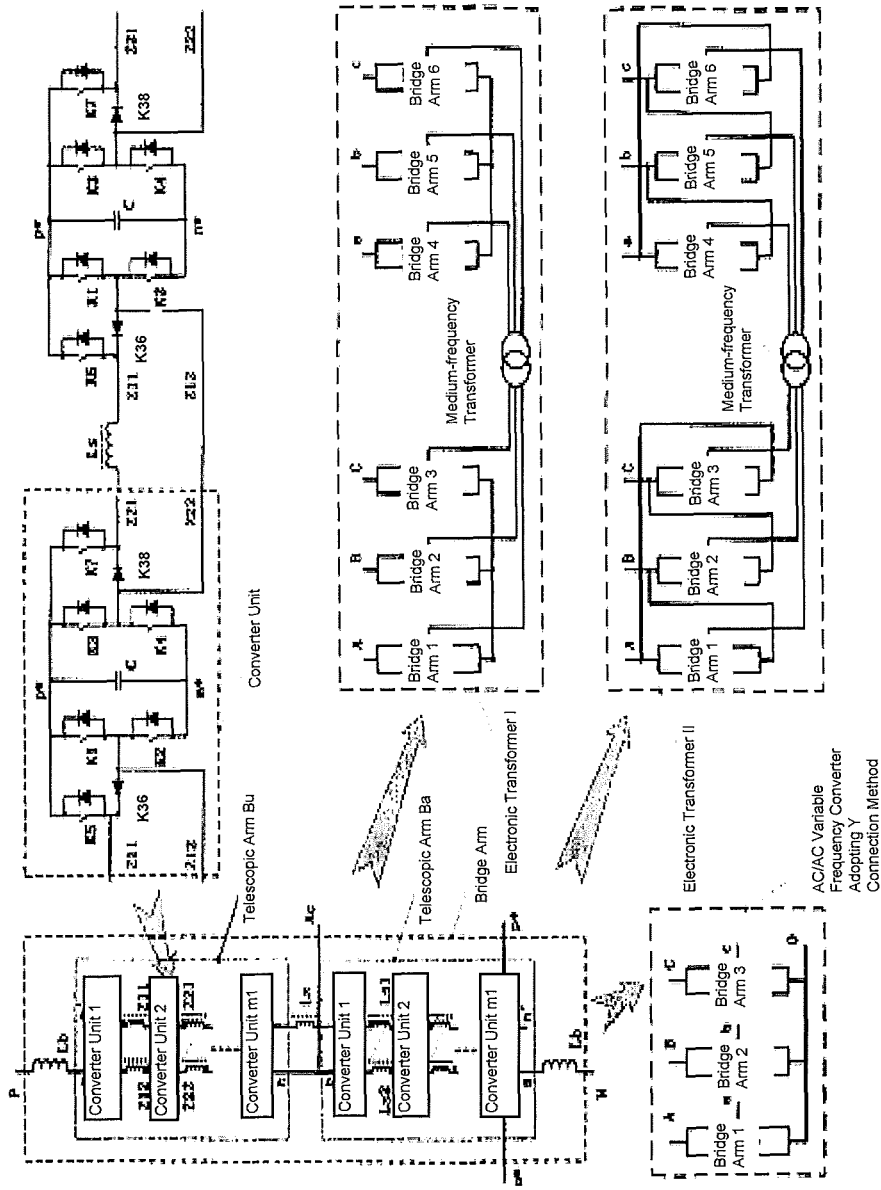
FIG. 12 illustrates an alternating/alternating variable frequency conversion circuit composed of the balance symmetrical units.

Another benefit brought by the aforementioned two-wire connection is that, pre-charging for the telescopic arm Uc can be accomplished as long as the low-voltage power source is connected with a pair of auxiliary terminals (e.g. p* and n* of the terminal n unit of Ed) of the bridge arm during startup of the bridge arm. Reference is made to FIG. 9 and FIG. 12.

1.3 Symmetrical Converter Units and the Connection Thereof

Figure 10:
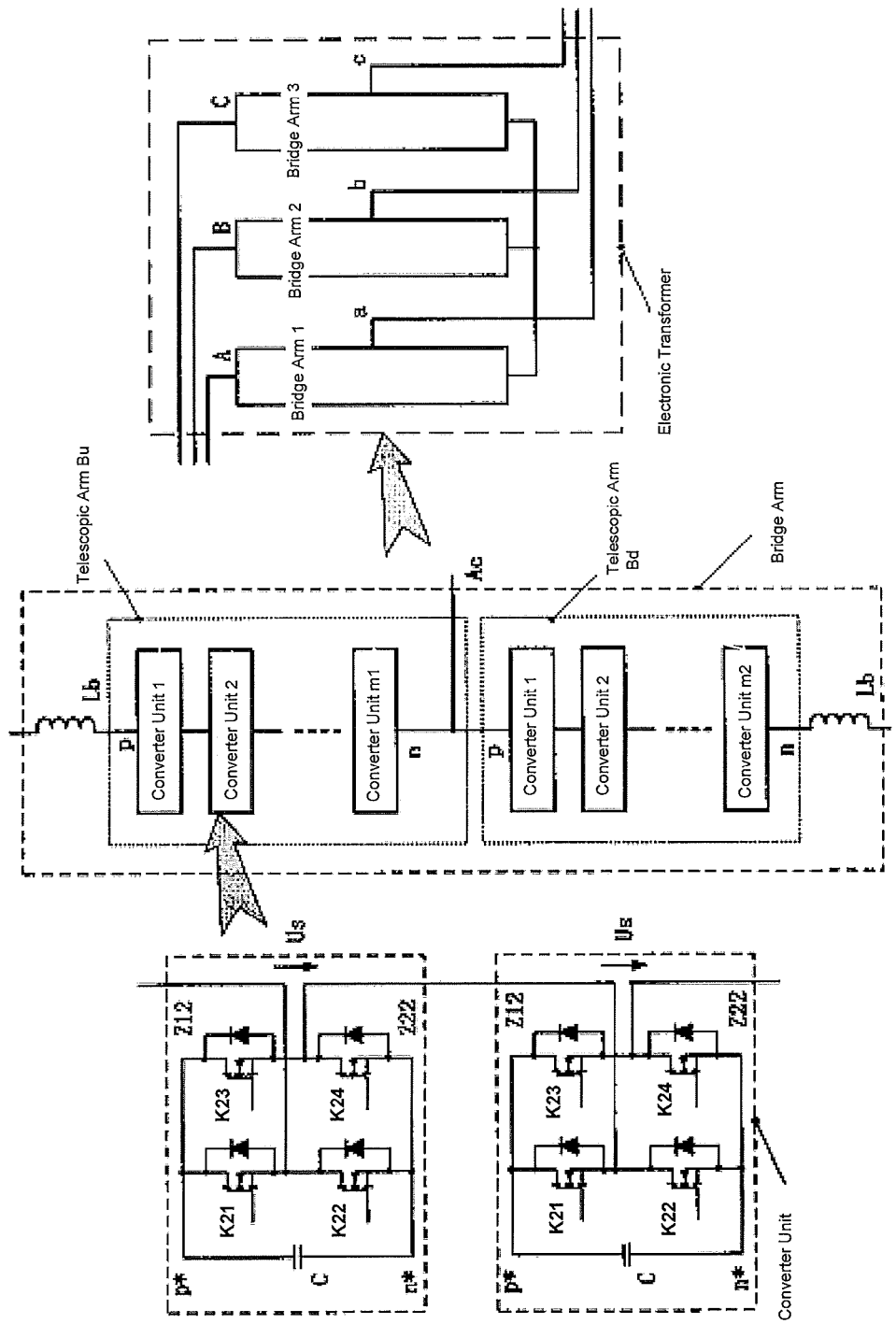
FIG. 10 illustrates a three-phase electronic voltage regulator composed of the symmetrical units.

A cascade circuit composed of symmetrical converter units as shown in the dotted box of FIG. 10) may be adopted as the telescopic arm of the present invention, the symmetrical converter units may be common full-bridge circuits and other conventional symmetrical converter units, and cascading connection between the units is achieved by a connection wire. Each symmetrical converter unit has three levels: −1, 0, and, 1, and two connection terminals Z12 and Z22 are completely symmetrical, and voltage plateau between unit terminals is Us (i. e. voltage between Z12 and Z22).

The telescopic arm of the present invention is the same as the fourth circuit above. When the converter units are all connected to an independent power source, the telescopic arm can be applied to DC/AC conversion or AC/DC conversion; and when there is no independent power source for the converter units, only alternating current reactive conversion (e.g.

STATCOM and APF applications) can be realized by the telescopic arm because of lack of direct current access points.

However, if the fourth circuit, is used as the telescopic arm of the present invention, then the bridge arm composed of these telescopic arms and the series inductors Lb can be used for DC/AC or AC/DC high-voltage conversion except that there is no automatic balancing for Uc of the converter units, thus large difficulty in balance control becomes its weakness.

1.4 Balance Asymmetrical Converter Units and the Connection Thereof

The balance asymmetrical converter units (asymmetrical units for short) in the present invention and an example of the cascading connection thereof are shown in FIG. 3. In FIG. 3, Ls is disposed between Z21 of the first unit (the unit on the left) and Z11 of the second unit (the unit on the right), achieving the effect similar to that when disposed between Z22 of the first unit (the unit on the left) and Z12 of the second unit (the unit on the right), so detailed description is not needed herein. For convenience, FIG. 3 is herein regarded as the example to illustrate the principle.

Referring to FIG. 3, during operation of the converter units, within each converter unit, switches K1 and K2 cannot be turned on simultaneously, and similarly, switches K3 and K4 cannot be turned on simultaneously either. To prevent short circuit resulted from simultaneous turn-on of the upper and lower switches, there is a dead zone gap for the turn-on action of K1 or K2 (and K3 or K4) of each unit with the time being slightly longer than the error time of switch control, and a pair of switches is not turned on within the dead zone time. Unit cascade voltage Us is the voltage between Z12 and Z22 within each unit that has two levels: 0 and 1. Us can be controlled by controlling the two switches K1 and K2 within each unit. For example: Us is Uc if K1 is turned on and K2 is turned off; and Us is 0 if K1 is turned off and K2 is turned on. The average value of Us of the converter units can be controlled by controlling the turn-on/off time ratio and phase of the switches within a switch period, so as to reach the effect of conversion regulation. A special state is reached if both K1 and K2 within a unit are turned off, and Us is indeterminate while there is no current passage; Us presents itself as Uc if a current passes through the reverse conducting diodes of K1.

A mode of vertically-mismatched connection between the adjacent units is adopted in the telescopic arm composed of the balance asymmetrical converter units, so levels that can be utilized by each unit are 0 and 1, and 1 level corresponds to 1 Uc. The telescopic arm formed by cascading connection of N converter units has N+1 levels, and in the bridge arm composed of such two telescopic arms, the controllable level number of $U_{AcN}$ is still N+1. For example, three controllable levels of the telescopic arm are 0, Uc and 2 Uc respectively after cascading connection of two balance asymmetrical converter units.

K3 and K4 of each unit play a role of balancing in the asymmetrical converter units. The difference of Uc of the adjacent units will accomplish automatic voltage sharing by means of charge transfer of adjacent relevant switches (i.e. relevant switches of the adjacent units) during cascading connection of the converter units. In FIG. 3, K3 and K4 of the unit on the left and K1 and K2 of the unit on the right all belong to the adjacent relevant switches.

When switches K2 of the unit on the right and K3 of the unit on the left among these adjacent relevant switches are turned on, C of the two adjacent units are connected in parallel through the switches, so that two Ucs are converged, wherein Ls or R plays a role of restricting voltage-sharing current impact. When connected with Ls in parallel, R plays a role of inhibiting oscillation of the balance current between units. For example, this oscillation can be inhibited effectively if R2<Ls1/C, however, use of R will increase the loss to some extent. Power consumption will increase if Ls is independently replaced by R. For easiness in description, only one Ls connection condition is given in FIG. 3. If the balance current is too large, it can also be restricted by controlling the turn-on time of K2 and K3 of each unit. The reverse conducting diodes of K1 and K4 of each unit offer a follow current channel when K2 and K3 of each unit are turned off. And if only the balance current passes through K3 and K4 of each unit, their power capacity requirements will be lower than those of K1 and K2 of each unit.

In the telescopic arm formed by cascading connection of the asymmetrical converter units, energy exchange can be achieved between the units through cascading connection terminals, to automatically balance the voltages Uc of the units.

K3 and K4 of the terminal n unit of the telescopic arm are unnecessary, but n' that is led out therefrom can be used for Uc balancing between Bu and Bd. It can be readily thought of that, on the basis of use of K3 and K4, a –Uc level can be added for the terminal n unit (and the telescopic arm) in such a manner that the terminal n' takes the place of the terminal n to serve as the negative terminal of the telescopic arm, thus imparting the telescopic arm with a Uc reverse voltage blocking function; and detailed description is not needed hereinafter.

1.5 Balance Symmetrical Converter Units and the Connection Thereof

FIG. 4 illustrates an example of the balance symmetrical converter units of the present invention and the cascading connection thereof. In FIG. 4, Ls is disposed between Z21 of the first unit (the unit on the left) and Z11 of the second unit (the unit of the right), achieving the effect similar to that when disposed between Z22 of the first unit (the unit on the left) and Z12 of the second unit (the unit on the right), so detailed description is not needed herein. For convenience, FIG. 4 is herein regarded as the example to illustrate the principle.

Referring to FIG. 4, during operation of the converter units, within each converter unit, switches K1 and K2 cannot be turned on simultaneous, and similarity, switches K3 and K4, K5 and K6, and K7 and k8 cannot be turned on simultaneously either. To prevent short circuit resulted from simultaneous turn-on of the upper and lower switches, there is a dead zone gap for the turn-on action of K1 and K2 (and K3 and K4, K5 and K6, K7 and K8) with the time being slightly longer than the error time of switch control, and a pair of switches is not turned on within the dead zone time. Unit cascade voltage Us is the voltage between Z12 and Z22 within one unit that has three levels: 0, 1 and –1. Us can be controlled by controlling the four switches K1, K2, K3 and K4 within one unit. For example: in one unit, Us is Uc if K1 and K4 are turned on and K2 and K3 are turned off; Us is –Uc if K1 and K4 are turned off and K2 and K3 are turned on; and Us is 0 if K1 and K3 are turned on or K2 and K4 are turned on. The average value of Us of the converter units can be controlled by controlling the turn-on/off time ratio and phase of the switches within a switch period, so as to reach the effect of conversion regulation. A special state is reached if K1, K2, K3 and K4 in one unit are all turned off, and Us is indeterminate while there is no current passage; Us presents itself as Uc if a current passes through the reverse conducting diodes of K1 and K4; and Us presents itself as −Uc if a current passes through the reverse conducting diodes of K2 and K3.

K5, K6, K7 and K8 of each unit are used for balancing in the symmetrical converter units, and the difference of Uc of the adjacent units will accomplish automatic voltage sharing by means of charge transfer of adjacent relevant switches during cascading connection of the converter units. In FIG. 4, K3, K4, K7 and K8 of the unit on the left and K1, K2, K3 and K4 of the unit on the right all belong to the adjacent relevant switches.

If K3 and K7 or K4 and K8 of the unit on the left among the adjacent relevant switches are turned on simultaneously, there will be zero level between the connection terminals Z21 and Z22 of the unit on the left; there will be zero level between the connection terminals Z11 and Z12 of the unit on the right if K1 and K5 or K2 and K5 of the unit on the right are turned on simultaneously; there will be levels 1 and −1 between the connection terminals Z21 and Z22 of the unit on the left if K3 and K8 or K4 and K7 of the unit on the left are turned on simultaneously; and there will be levels 1 and −1 between the connection terminals Z11 and Z12 of the unit on the right if K1 and K6 or K2 and K5 of the unit on the right are turned on simultaneously. Balancing of Uc of the two adjacent units can be normally conducted and voltages can be converged only if the levels of the terminals at the two sides are controlled to be consistent, wherein Ls or R plays a role of restricting voltage-sharing current impact. When connected with Ls in parallel, R plays a role of inhibiting oscillation of the balance current between units. For example, this oscillation can be inhibited effectively if $R^2<Ls1/C$. Power consumption will increase if Ls is independently replaced by R. For easiness in description, only one Ls connection condition is given in FIG. 4. If the balance current is too large, it can also be restricted by controlling the turn-on time of K5, K6, K7 and K8 of each unit; the turn-on/off conditions of these switches are similar to those of the switches in the asymmetrical converter units, so detailed description is not needed herein. And if only the balance current of Ls passes through K5, K6, K7 and K8 of each unit, their power capacity requirements will be lower than those of K1, K2, K3 and K4 of each unit.

Figure 6:
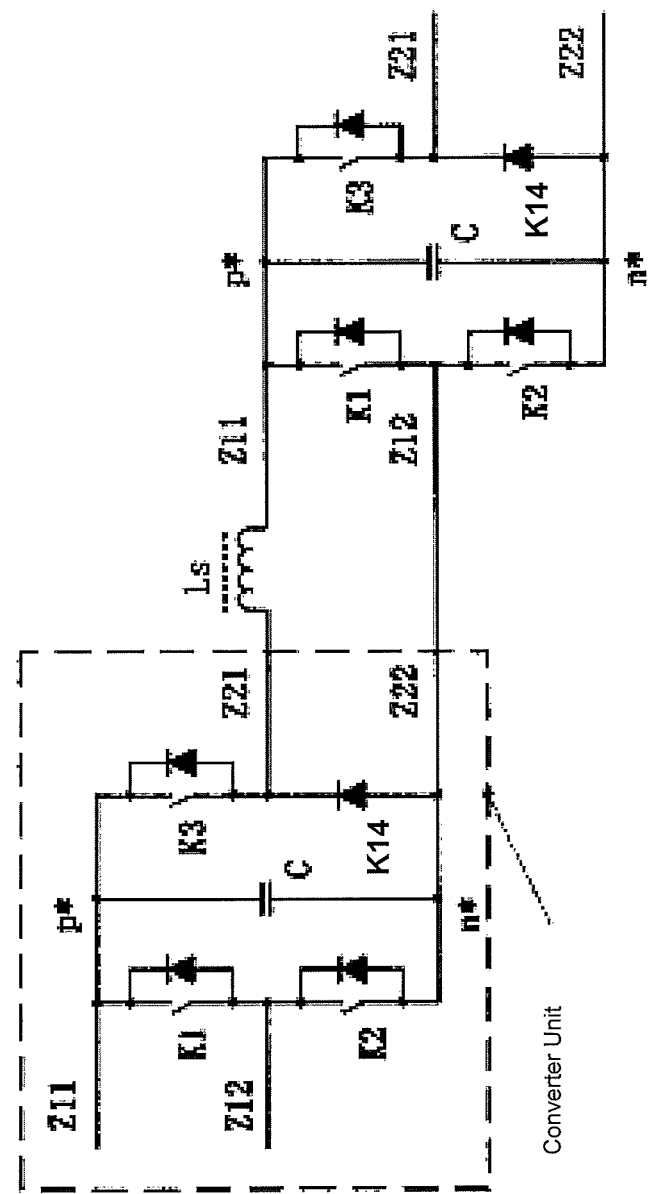
FIG. 6 illustrates the simplified balance asymmetrical converter units and the connection thereof.
Figure 7:
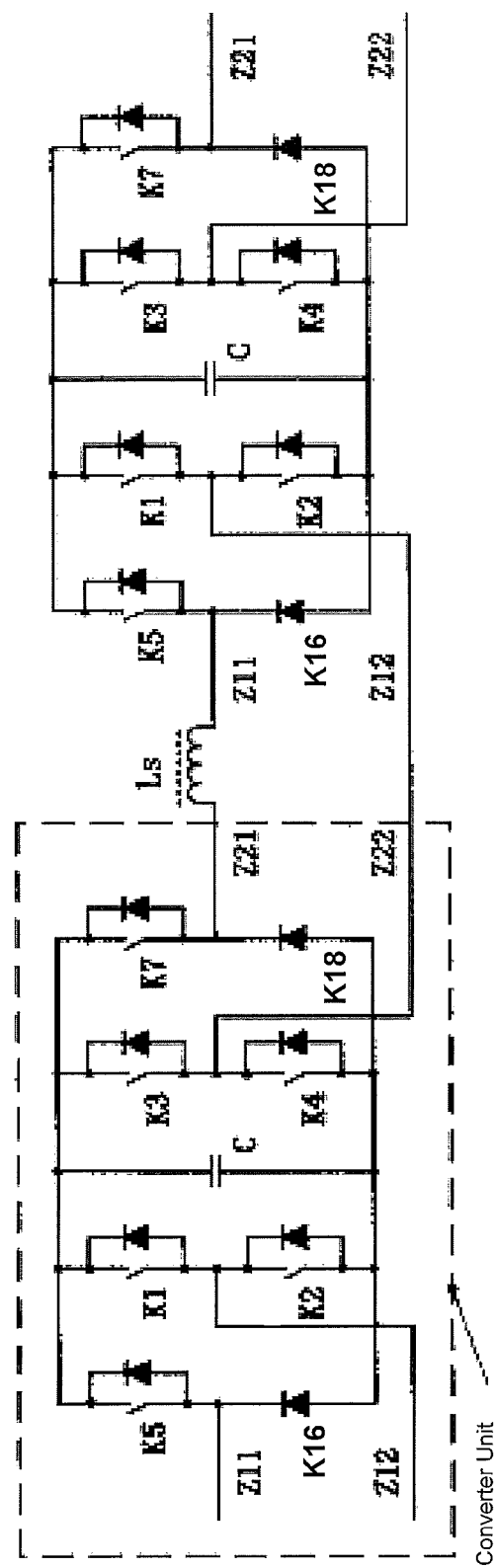
FIG. 7 illustrates the simplified balance symmetrical converter units and the connection thereof.

1.6 Simplification of the Balance Asymmetrical and Balance Symmetrical Converter Units, Connection Between the Units and Application Characteristics FIG. 6 illustrates an example of the simplified balance asymmetrical converter units and the cascading connection thereof, and K14 in everyone converter unit is simplified as diode; referring to FIG. 9, a similar effect is reached in the case that K11 in everyone converter unit is simplified as diode. FIG. 7 illustrates example of the simplified balance symmetrical converter units and the cascading connection thereof, and K16 and K18 in everyone converter unit are simplified as diodes. In the above simplified circuits, the control mode for balance current is different because circulation of the current of Ls cannot be maintained through those switches.

Shown in FIG. 12 is an example of the simplified balance symmetrical converter units with a change in connection of the diode terminals, as shown by diodes K36 and K38 in each unit. This change in connection does not affect the follow current function of Ls, but a shortened channel for the balance current could reduce some losses. The mode of direct connection of Z21 and Z11 between the adjacent balance asymmetrical units can save elements. The telescopic arm formed by such a connection, which is similar to the fifth circuit above, pertains to the present invention if used for formation of the bridge arm, but it has the defect of tack of a restriction mechanism upon the balance current; it has the advantage of facilitating integration of the telescopic arms into one module to further promote high-voltage small-power applications. The mode of direct connection of Z21 and Z11 between the adjacent symmetrical units reaches a similar effect, so detailed description is not needed herein.

For a telescopic arm that is formed by mixed cascading connection of the asymmetrical units and the balance symmetrical units, the units therein may also be simplified by reference to the foregoing mode, so detailed description is not needed herein.

Generally, the simplification above does not apply to the switches at the outer sides of the two ends of the telescopic arm.

When the units are connected through two inductors, Ls1 and Ls2 may have the same value. Use of these separate inductors brings the benefit that, the series inductors Lb can be scattered among the units, thus large inductors are not required in the converter. Reference shall be made to FIG. 12 for the example of connection of coupled inductors, the mode of dotted terminal connection of Ls1 and Ls2 results in mutual enhancement of the magnetic fluxes of Uc balance currents in the two inductors, thereby increasing the difference mode inductance between the units. Use of these coupled inductors brings the benefit that, magnetic fluxes resulted from macro currents (i.e. $I_P$ and $I_N$) between the units are mutually offset in the coupled inductors, as a result, the volume of connection inductors can be reduced.

When two connection inductors are adopted between the units, two connection wires are actually under an equivalent condition, switches for balancing are no longer assigned in the asymmetrical and balance symmetrical units, and all the switches participate equally in power transmission and Uc balancing, which is favorable for improving the conversion power of the units.

R is a damping resistor, which plays a role of inhibiting oscillation of the balance current between the units. For example, in the case of the separate inductors, such an oscillation can be inhibited effectively if $R^2<2Ls1/C$.

Figure 5:
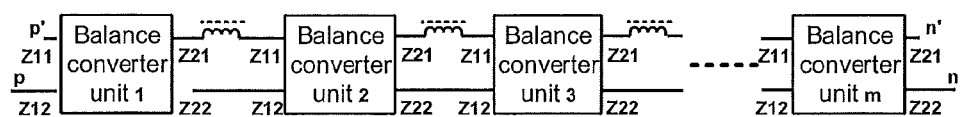
FIG. 5 illustrates the telescopic arm composed of the balance units.

1.7 Application Characteristics of the Balance Asymmetrical Converter Units and the Balance Symmetrical Converter Units Both the balance asymmetrical converter unit and the balance symmetrical converter unit belong to balance converter units, and for the example of a telescopic arm composed of the balance converter units, reference shall be made to FIG. 5. The advantages of both the balance converter unit and the symmetrical converter unit are combined in the balance symmetrical converter unit, which can realize not only balancing for Uc between the units, but also the symmetry between the cascading connection terminals at the both sides.

The telescopic arms composed of the symmetrical and balance symmetrical units further form a bridge arm, which is mainly applied to AC/AC conversion (including alternating current active and reactive conversions) and may also be applied to AC/DC conversion or DC/AC conversion. In the AC/AC conversion, for example, if Bu and Bd have an equal unit number m, then the level numbers of $U_{PN}$ of the telescopic arms and $U_{AcN}$ of the bridge arm are both 2*m+1. And in the AC/DC conversion or DC/AC conversion, if $U_{PN}<m*Uc$, then the amplitude of $U_{AcN}$ may exceed that is to say, the alternating current voltage amplitude is larger than direct current voltage source!

The telescopic arms composed of the balance asymmetrical units further form a bridge arm, which can be applied to AC/DC conversion and DC/AC conversion. If n' is used as the negative terminal of the telescopic arm, then for AC/DC/AC conversion, DC voltage amplitude can be utilized better because the voltage at the point Ac can be one level higher or lower than $U_{PN}$.

The telescopic arms formed by mixed cascading connection of the balance asymmetrical units and the balance symmetrical units further form a bridge arm, which is relatively suitable for being applied under the aliasing condition of AC and DC voltages. For example, in a DC/AC converter circuit; the telescopic arms that are formed by mixed cascading connection can be used if AC output voltage is higher than DC input voltage.

1.8 Pulse Control Modes of the Converter Bridge Arm

There may be a variety of switch pulse control modes for the present invention on the premise that the requirement of balancing Uc of the converter units in the bridge arm is met. In fact, many pulse modulation schemes for common two-level inverter bridges can be used for controlling the converter bridge arm of the present invention, e.g. staircase waveform method (low order harmonic content minimization method, selective harmonic elimination method, etc.), pulse width modulation (PWM) (including harmonic elimination method, switch frequency optimization method, phase-shifted pulse width modulation method and space vector modulation method, and pulse amplitude modulation method). Sinusoidal pulse width modulation (SPWM), especially sinusoidal phase-shifted pulse width modulation method therein, is relatively suitable for pulse control in the present invention.

The corresponding switch actions of all the converter units may be synchronous (e.g. K1 of all the units is synchronous), however, this will lead to a quite high voltage change rate at the point Ac so as to be unhelpful to electromagnetic compatibility, and moreover, a very large filter typically needs to be configured for the circuit. This approach has the advantage that the energy storage capacitors C of the units can still operate even if their values are quite small.

If previous and later actions of the corresponding switches of all the converter units differ slightly in order (e.g. by 1 microsecond), namely pulse phases between the adjacent units are delayed, then voltage can rise and drop by a ramp, contributing to reduction of the impact on power source and load.

Adoption of the control mode of identical pulse phase or phase delay in the units of the same telescopic arm equals replacement of high-voltage power semiconductor switches by the telescopic arms, and this brings much better reliability in voltage sharing control compared with direct series connection of low-withstanding-voltage power semiconductor switches.

If the corresponding switches of all the converter units are orderly out-of-phase by an equal angle according to the same switch period, the most smooth voltage waveform can be generated at the point Ac, the frequency of switch ripple is obtained by multiplying the switch frequency of the converter unit by the number of the converter units under cascading connection, and this method is known as sinusoidal phase-shifted pulse width modulation. For example, in the case of 19-level triangular wave carrier SPWM, every two carriers are staggered by 20°, and if the switch frequency of each converter unit is 10 kHz, the equivalent switch frequency of the telescopic arm can reach 180 kHz.

In the bridge arm, the corresponding switch actions of the two telescopic arms are complementary since the sum of voltages that the upper and lower telescopic arms withstand keeps unchanged (direct current voltages). Reasonable out-of-phase among the two telescopic arms and the multiphase bridge arm in the bridge arm is favorable for further inhibition of the switch ripple, in order to reduce the requirement of the converter on litter circuit remarkably.

In general, if the switches of all the converter units in the telescopic arm adopt synchronous actions, only a weak unbalanced dynamic of Uc will be aroused owing to inconsistent switch characteristics and other factors, and the problem is not severe even in the absence of Ls or R; however, a large unbalance dynamic of Uc will be aroused if delay, or even phase shift, is adopted, and this problem can be effectively solved by the balance mechanism in the present invention!

The three-phase converter circuit in the present invention can employ not only the aforementioned sinusoidal phase-shifted pulse width modulation, but also sinusoidal space vector pulse width modulation (SVPWM) and phase-shifted SVPWM methods that are used in conventional three-phase six-switch converters; and its applications in both DC/AC conversion and AC/DC conversion can improve the voltage utilization rate of the circuit.

Figure 8:
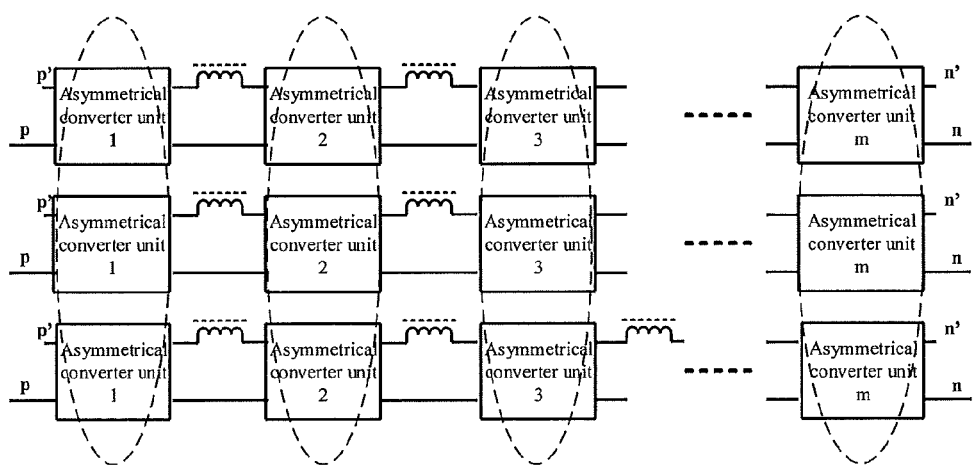
FIG. 8 illustrates the units located at the same positions of the telescopic arms.

An example of the specific approach is as below: each telescopic arm in the three-phase bridge arm is regarded as a conventional two-level switch, the conventional space vector modulation method is used for every unit in the bridge arm, all the converter units under cascading connection adopt the same switch period, the appositional units in the three bridge arms are orderly out-of-phase by an equal angle in each group, in this way, the most smooth sinusoidal voltage waveform can be generated among the three points Ac, and simultaneously, the advantage of high voltage utilization rate of the direct current source in the space vector modulation scheme can be put into full use as well. FIG. 8 illustrate an example about differentiation of the appositional units in the telescopic arm, three telescopic arms in FIG. 8 are three telescopic arms Bu of the three bridge arms in FIG. 9 respectively, and the converter units in the dotted box, every three of which are grouped, are considered as the appositional units; in addition, three other telescopic arms Bd of the three bridge arms further have three other corresponding appositional units; therefore, there are six appositional units in each group in total.

1.9 Various Converters Composed of the Converter Bridge Arms

The asymmetric bridge arm of the present invention can be used for bidirectional DC/DC conversion. The terminal An is one of the direct current terminals in DC/DC conversion application, and is an alternating current terminal in DC/AC application. During DC/DC application, a buck DC/DC converter is formed if terminals P and N are input terminals and Ac (after connection with a filter inductor in series) and N are output terminals; on the contrary, a boost DC/DC converter is formed if Ac (after connection with a filter inductor in series) and N are input terminals and terminals P and N are output terminals. The telescopic arms are unsuitable for maintaining steady direct currents ($I_P$ or $I_N$) and the energy exchange efficiency is quite low by means of two-wire connection between Bu and Bd, so pulse voltage is often output from $U_{AcN}$ in a DC/DC circuit, and series connection of the filter inductors at the terminals Ac is necessary.

During alternating current applications, AC voltage is formed between N (or P) and Ac by the bridge arm, and Ac serves as an AC terminal. The scheme of the present invention is applicable to three-phase conversion of DC/AC and AC/DC, but not limited to three-phase.

If one direct current power source is shared by three bridge arm direct current terminals, three-phase voltage can be formed at the terminals Ac of three bridge arms. One of the examples shown in FIG. 9 is a high-voltage rectification/inversion circuit. A, B and C are three-phase input points of a power grid, the power grid provides direct current for three-phase inverter bridges of the present invention through rectifiers, and three-phase high-voltage frequency conversion voltage is output from points a, b and c at the inverter side to achieve motor drive. Sinusoidal voltage is typically output from the high-voltage rectification/inversion circuit, and as a matter of fact, square wave voltage or trapezoidal wave voltage can be output in a similar way to drive such loads as brushless permanent magnetic motor.

Another example shown in FIG. 9 is a DC/AC converter circuit for photovoltaic grid-connected inversion, wherein grid-connected current is the control object of the terminal Ac.

A high-voltage frequency conversion circuit composed of two back-to-back three-phase inverter circuits is another example shown in FIG. 9. The AC-DC-AC rectification/inversion converter circuit is generally known as back-to-back high-voltage frequency converter, a three-phase alternating current terminal is led from Ac of the first group of three bridge arms, a second three-phase alternating current terminal is led from Ac of the other group of three bridge arms, and this circuit may be used for non-transformer high-power-factor frequency conversion drive of a high-voltage motor and may also be applied to power transmission/distribution conversion in a power system.

In DC/AC and AC/DC conversion applications, the units in Bu and Bd are typically identical to each other in number to save the units; however, in DC/DC application, the number of units may differ based upon the ratio of input/output voltages.

For a multiphase star connection method, the terminals P of a plurality of bridge arms can be used as input terminals for various phases, the terminals Ac of the bridge arms can be used as output terminals for various phases, and the terminals N of a plurality of bridge arms are connected together to serve as common neutral points for input and output. For a multiphase polygon connection method, the terminals P and N a plurality of bridge arms can be connected in sequence and these connection points are used as input terminals for various phases, and the terminals Ac of the bridge arms are used as output terminals for various phases.

For three-phase, the star connection method is exactly the Y connection method, the polygon connection method is exactly the triangle connection method. FIG. 10 illustrates a three-phase electronic voltage regulator that adopts the Y connection method. A three-phase four-wire connection method can also be formed if neutral wires are led from three bridge arm common connection points in FIG. 10. This circuit is a three-phase circuit in which energy can flow in a bidirectional way, and may have the function of electronic voltage regulation. Alternating current is fed in from the input terminals (A, B and C), and alternating current with the same frequency can be acquired at the output terminals (a, b and c). When the units in Bu and Bd are identical to each other in number, the voltage regulation function with a transformation ratio from 0 to 2 (theoretical value) can be obtained by controlling the switches (K21, K22, K23, and K24) of the telescopic arms; this circuit may also be applied in an opposite way, with the transformation ratio approximately being 2 to 20. When the input/output ratios in application are close and SPWM control is employed, the number of units in Bu may be smaller than that in Bd to save the units; at this point, the current that passes through Bd is significantly lower than Bu, which is similar to auto-transformer.

The electronic voltage regulator has the functions of voltage regulation, phase modulation and asymmetry correction, is a device with a very flexible transformation ratio and the function of bidirectional voltage regulation, and can be used for power distribution voltage regulation for important loads like power system.

Figure 11:
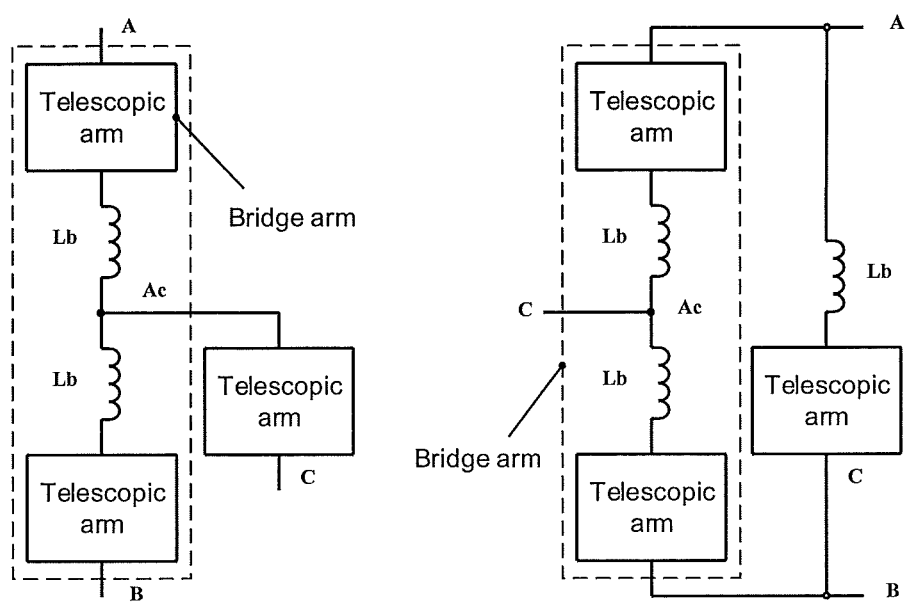
FIG. 11 illustrates an AC converter circuit composed of the balance symmetrical telescopic arms.

FIGS. 11 (*a*) and (*b*) respectively illustrate the examples of Y-shaped and triangular converters composed of the symmetrical telescopic arms, wherein the units in each of the telescopic arms may be identical in number. The telescopic arm composed of the symmetrical units can be used for forming a three-phase reactive converter, which is actually the fourth converter circuit mentioned above. The present invention can solve the problem of difficult voltage balancing in the energy storage capacitors of the units in the fourth circuit by adopting the telescopic arms formed by cascading connection of the balance symmetrical units, and should be well used in alternating current reactive applications. It can be easily understood that, further addition of the telescopic arms can form a multiphase star converter or a polygon reactive converter.

From the view of principle, those symmetrical units may also be used for AC/AC frequency conversion, but better reliability is only achieved by use of the balance symmetrical units because balance control in the frequency conversion circuit is complex. An AC/AC frequency converter adopting the Y connection method in FIG. 12 is similar to the circuit in FIG. 10 in the aspect of form, but a function of frequency conversion is added in this AC/AC frequency converter.

For an AC/AC frequency converter that adopts the single-phase and star connection method, given that input and output voltages on the same bridge arm could sometimes have approximate amplitudes but opposite directions, it is appropriate to enable the number of units in Bu to be twice the number of units in Bd on the premise that the input/output transformation ratio is approximately 1.

Further shown in FIG. 12 are electronic transformers that adopt the Y connection method and the triangle connection method. For the triangle connection method, it is appropriate that the ratio of the number of units Bu to the number of units in Bd is 1:1; and for the Y connection method, it is more appropriate that the ratio of the number of units in Bu to the number of units in Bd is 2:1. Use of the AC/AC topology definitely saves more units than the conventional back-to-back AC/DC/AC topology (the ratio is approximately 3:4).

In the electronic transformers of the present invention, both conventional sinusoidal/sinusoidal frequency converters and sinusoidal/square wave converters can be adopted in AC/AC, enabling medium-frequency transformers to operate under square waves to improve the conversion efficiency. The volume of the transformers is greatly reduced since the medium frequency adopted (e.g. 5 kHz) is much higher than power frequency (50 Hz).

1.10 Description and Embodiments

The symbols p' and n' in the drawings represent Z11 and Z21 of the asymmetrical and balance symmetrical units respectively, and they are present on the units (which are terminal p and n units respectively) at the outer side of the telescopic arm. The symbol m in the drawings represents the number of units of the telescopic arm, and m1 and m2 represent the number of units in Bu and the number of units in Bd, respectively.

As an extension of the present invention, one switch of the present invention is replaced by a special telescopic arm (herein referred to as micro telescopic arm) of the present invention, thereby forming the telescopic arm, the bridge arm and the converter system. The corresponding switches (e.g. all K1) of the units in the micro telescopic arm adopt the control mode of identical pulse phase, so that the capacitance of the micro telescopic arm can be much smaller than that of the units in the telescopic arm, facilitating adoption of modular encapsulation. In fact, the micro telescopic arm can be used as a high-voltage switch and accordingly tends to construct a converter system with higher voltage class.

The aforementioned various inventive contents set forth in this application may be implemented in an independent or mixed way. FIG. 9, FIG. 10, FIG. 11 and FIG. 12 all illustrate the embodiments of the present invention. And two of these embodiments are detailed below.

(1) 11-level non-transformer high-voltage frequency converter Shown as the back-to-back high-voltage frequency converter in FIGS. 9, A, B and C are input three-phase voltages, and a, b and c are output three-phase voltages. The circuit is of a back-to-back AC/DC/AC converter structure; the telescopic arm is composed of the balance asymmetrical converter units; the Ls-added double-wire connection described in 1.2 is adopted between the upper and lower telescopic arms: two groups of the three-phase bridge arms both operate under the SVPWM mode described in 1.8, the unit switch frequency is 10 kHz, and the telescopic arm has an equivalent switch frequency of 100 kHz. The number of units in each telescopic arm is 10 and the level number of the bridge arm is 11. The circuit is used for making up a three-phase high-voltage frequency conversion drive, and line voltage can reach 14.1 kV alternating current if each level is 2000V.

A low-voltage power source can be added between p* and n* of the terminal n unit of Bd (or between p* and n* of the terminal p unit of Bu) during startup; and the bridge arm can be directly switched to high voltage without a special high-voltage pre-charging line only if Bu and Bd are shrunk and the telescopic arms are stretched after c in the units is charged and electrified. In addition, if double-wire connection between Bu and Bd exists, this will be advantageous for simplifying startup control. It would be more advantageous for starting up a power source that Lb below Bd is moved to the terminal Ac of the bridge arm in FIG. 9, and this Bd is composed of asymmetrical units, so n* of the terminal n unit of this Bd is the terminal N of the bridge arm, and for the bridge arm, only a terminal p* of the terminal n unit of this Bd needs to be led.

(1) 15-Level Electronic Voltage Regulator

As shown in FIG. 15, three bridge arms correspond to three-phase voltage regulation, each bridge arm is composed of two telescopic arms Bu and Bd and two Lb, and the telescopic arm is composed of seven symmetrical converter units, in consideration of 7 zero levels that overlap, the telescopic arm has 15 levels because each converter unit has three levels. The circuit has a unit switch frequency of 5 kHz, phase-shifted SVPWM modulation is adopted between the units, and the telescopic arm has an equivalent switch frequency of 35 kHz. The line voltage of the voltage regulator can reach 39.6 kV alternating current if each level is 4000V.

(2) Photovoltaic Grid-Connected Inverter Circuit Formed by Mixed Cascading Connection of Asymmetrical Units and Symmetrical Units It is worth mentioning that, in the high-voltage rectification/inversion circuit of FIG. 9, mixed cascading connection of asymmetrical units and balance symmetrical units is adopted in the combined switch if DC input voltage is not high enough, thus the circuit is capable of realizing the booster conversion function well. It can be determined that the series voltage of the asymmetrical unit Uc is equal to DC voltage and the series voltage of the balance symmetrical unit Uc is slightly higher than the DC-exceeding amplitude part of AC. When output voltage exceeds DC voltage, the telescopic arms can withstand this reverse voltage. For example, mixed cascading connection of 10 asymmetrical units and 5 symmetrical units is adopted in the combined switch, the value of output voltage peak at the neutral point of the bridge arm, which can be used during grid-connected power generation, can reach 30 kV under 20 kV DC voltage if each level is 2000V.

INDUSTRIAL APPLICABILITY

The present invention is suitable for multilevel, medium-voltage, high-voltage, and even ultrahigh-voltage AC/DC, DC/AC, DC/DC conversion, can be widely applied to medium/high-voltage frequency conversion, power electronic transformer, direct new energy grid connection and smart grid applications, and is particularly suitable for ultra-high-voltage conversion applications in a power system.

The invention claimed is:

1. A converter bridge arm suitable for high-voltage applications, which includes an energy storage capacitor and a plurality of reverse conducting switches; wherein, the converter bridge arm is formed by a series connection of an upper telescopic arm, a lower telescopic arm, and an inductor set, wherein the upper telescopic arm and the lower telescopic arm are each formed by a cascading connection of a plurality of symmetrical units;

wherein, each symmetrical unit of the plurality of symmetrical units includes a first switch, a second switch, a third switch, a fourth switch and an energy storage capacitor; the first switch and the second switch are connected in series; the third switch and the fourth switch are connected in series; a positive terminal of the first switch is connected with a positive terminal of the third switch to serve as a positive terminal of the symmetrical unit, and a negative terminal of the second switch is connected with a negative terminal of the fourth switch to serve as a negative terminal of the symmetrical unit; the energy storage capacitor is connected between the positive terminal and the negative terminal of the symmetrical unit; a junction between the first switch and the second switch is a second cascading connection terminal of the symmetrical unit, and a junction between the third switch and the fourth switch is a fourth cascading connection terminal of the symmetrical unit;

wherein, the cascading connection of the plurality of the symmetrical units includes, between two adjacent symmetrical units, the fourth cascading connection terminal of a former symmetrical unit of the two adjacent symmetrical units is connected with the second cascading connection terminal of a latter symmetrical unit of the two adjacent symmetrical units;

wherein, the converter bridge arm further includes a positive terminal and a negative terminal;

wherein, a positive terminal and a negative terminal of an uppermost symmetrical unit of the upper telescopic arm, a positive terminal and a negative terminal of a lowermost symmetrical unit of the upper telescopic arm, a positive terminal and a negative terminal of an uppermost symmetrical unit of the lower telescopic arm, and a positive terminal and a negative terminal of a lowermost symmetrical unit of the lower telescopic arm serve as auxiliary terminals of the converter bridge arm;

wherein, the second cascading connection terminal is taken as a positive terminal of the converter bridge arm and the fourth cascading connection terminal is taken as a negative terminal of the converter bridge arm;

wherein, a neutral point of the converter bridge arm is led from a conjunction between a negative terminal of the upper telescopic arm and a positive terminal of the lower telescopic arm; and wherein, the inductor set is one selected from the following:

(1) the inductor set includes one inductor, which is located at any position of the series connection of the upper telescopic arm and the lower telescopic arm;

(2) the inductor set includes two inductors, which are located at opposing sides of the neutral point of the converter bridge arm such that the neutral point of the converter bridge arm is disposed between the two inductors; and (3) the inductor set includes a plurality of inductors, each of the plurality of inductors being disposed between two adjacent symmetrical units;

wherein, an AC/AC convertor including one or more of the converter bridge arms is connected in one of the following configurations:

(a) an alternating current port fed from positive and negative terminals of one converter bridge arm, and another alternating current port led from the neutral point of the converter bridge arm, such that a single AC/AC converter is formed;

(b) a multiphase alternating current port fed from positive and negative terminals of each of the converter bridge arms in accordance with a polygon or star connection method, and another multiphase alternating current port is led from neutral points of each of the converter bridge arms; and (c) positive and negative terminals of a first group of three converter bridge arms are connected with various input phases respectively in accordance with a triangle or star connection method, and positive and negative terminals of a second group of three converter bridge arms are connected with various output phases respectively in accordance with a triangle or star connection method; the neutral point terminals of the first and second groups of three converter bridge arms are connected with primary and secondary windings of a three-phase medium-frequency transformer respectively, such that an electronic transformer is formed.

2. A converter control configuration based on the converter bridge arm according to claim 1, wherein: terminal voltages (Us) of the symmetrical units in the upper and lower telescopic arms are controlled by regulating drive pulses of all switches, so as to control terminal voltages (Uu) and (Ud) of the upper telescopic arm and the lower telescopic arm; an average current ($I_{PN}$) passing between positive and negative terminals of the converter bridge arm is controlled by dynamically regulating a sum of the voltage (Uu) and the voltage (Ud), so as to control an average value of voltage (Uc) of all the symmetrical units in the converter bridge arm; regulation for voltage potential at an neutral point terminal is achieved by complementarily regulating the voltage (Uu) and the voltage (Ud); distribution of currents ($I_P$) and ($I_N$) of the upper telescopic arm and the lower telescopic arm is changed by dynamically regulating a relative magnitude of the voltage (Uu) and the voltage (Ud), so as to balance a difference between an average value of the voltage (Uc); and differences of the voltage (Uc) on an energy storage capacitor of the symmetrical units in the telescopic arms are balanced by regulating a relative magnitude of average values of a terminal voltage (Us) of the symmetrical units in the upper telescopic arm and the lower telescopic arm.

3. The converter control configuration according to claim 2, wherein: the converter control configuration is one selected from followings:

(1) a configuration of identical pulse phase is configured for the symmetrical units in a same telescopic arm;

(2) a configuration of phase-shift is configured for the symmetrical units in a same telescopic arm;

(3) a configuration of a sinusoidal pulse width modulation (SPWM) in which carriers are equally phase-shifted based upon angle of circumference is configured for the symmetrical units in a same telescopic arm, and carriers phases of the corresponding symmetrical units between the upper telescopic arm and the lower telescopic arm are complemented; or (4) a configuration of a three-phase DC/AC, AC/DC converter formed by three bridge arms, six symmetrical units, which are located at same positions of the bridge arms, are grouped and controlled under a sinusoidal space vector pulse width modulation (SVPWM) mode, and modulated carriers of the symmetrical units in the same telescopic arm are equally phase-shifted based upon angle of circumference.

4. A converter bridge arm suitable for high-voltage applications, which includes a plurality of energy storage capacitors and a plurality of reverse conducting switches, each reverse conducting switch includes a switch and a reverse conducting diode connected in parallel; wherein, the converter bridge arm is formed by a series connection of an upper telescopic arm, a lower telescopic arm, and an inductor set, wherein the upper telescopic arm and the lower telescopic arm are each formed by a cascading connection of a plurality of balance units; and the balance unit is a balance asymmetrical unit or a balance symmetrical unit;

wherein, the balance asymmetrical unit includes a first switch of the balance asymmetrical unit, a second switch of the balance asymmetrical unit, a third switch of the balance asymmetrical unit, a fourth switch of the balance asymmetrical unit, and an energy storage capacitor of the balance asymmetrical unit; the first switch and the second switch of the balance asymmetrical unit are connected in series; the third switch and the fourth switch of the balance asymmetrical unit are connected in series a positive terminal of the first switch of the balance asymmetrical unit is connected with a positive terminal of the third switch of the balance asymmetrical unit to serve as a positive terminal of the balance asymmetrical unit and also a first cascading connection terminal of the balance asymmetrical unit; a negative terminal of the second switch is connected with a negative terminal of the fourth switch to serve as a negative terminal of the balance asymmetrical unit and a fourth cascading connection terminal of the unit; the energy storage capacitor of the balance asymmetrical unit is connected between the first cascading connection terminal and the fourth cascading connection terminal of the balance asymmetrical unit; a junction between the first switch and the second switch of the balance asymmetrical unit is a second cascading connection terminal of the balance asymmetrical unit, and a junction between the third switch and the fourth switch of the balance asymmetrical unit is a third cascading connection terminal of the balance asymmetrical unit;

wherein, the balance symmetrical unit includes a first switch of the balance symmetrical unit, a second switch of the balance symmetrical unit, a third switch of the balance symmetrical unit, a fourth switch of the balance symmetrical unit, a fifth switch of the balance symmetrical unit, a sixth switch of the balance symmetrical unit, a seventh switch of the balance symmetrical unit, an eighth switch of the balance symmetrical unit and an energy storage capacitor of the balance symmetrical unit; wherein, the first switch of the balance symmetrical unit is connected with the second switch of the balance symmetrical unit in series, a junction therebetween is a first cascading connection terminal of the balance symmetrical unit; the third switch of the balance symmetrical unit is connected with the fourth switch of the balance symmetrical unit in series, a junction therebetween is a third cascading connection terminal of the balance symmetrical unit; the fifth switch of the balance symmetrical unit is connected with the sixth switch of the balance symmetrical unit in series, a junction therebetween is a second cascading connection terminal of the balance symmetrical unit; the seventh switch of the balance symmetrical unit is connected with the eighth switch of the balance symmetrical unit in series, a junction therebetween is a fourth cascading connection terminal of the balance symmetrical unit; positive terminals of the first switch, the third switch, the fifth switch, and the seventh switch of the balance symmetrical unit are connected to serve as a positive terminal of the balance symmetrical unit, and negative terminals of the second switch, the fourth switch, the sixth switch and the eighth switch of the balance symmetrical unit are connected to serve as a negative terminal of the balance symmetrical unit; and two terminals of the energy storage capacitor of the balance symmetrical unit are connected between the positive terminal and the negative terminal of the balance symmetrical unit;

wherein, the cascading connection of the plurality of balance units includes a plurality of two adjacent units, each two adjacent units includes a former unit and a latter unit, a third cascading connection terminal of the former unit is connected with a first cascading connection terminal of the latter unit, a fourth cascading connection terminal of the former unit is connected with a second cascading connection terminal of the second unit; wherein, a first connection between the former unit and the latter unit is formed with an inductor or a resistor or a parallel circuit of an inductor and a resistor, and a second connection between the former unit and the latter unit is directly connected;

wherein, a positive terminal of an outermost balance unit of the cascading connection of the plurality of balance units, and a negative terminal of another outermost balance unit of the cascading connection of the plurality of balance units serve as auxiliary terminals of the converter bridge arm; a second cascading connection terminal of a balance unit is taken as a positive terminal of the converter bridge arm and a fourth cascading connection terminal is taken as a negative terminal of the converter bridge arm; and wherein, a neutral point of the converter bridge arm is a conjunction between a negative terminal of the upper telescopic arm and a positive terminal of the lower telescopic arm; and the inductor set is one selected from the following:

(1) the inductor set includes one inductor, which is located at any position of the series connection of the upper telescopic arm and the lower telescopic arm;

(2) the inductor set includes two inductors, which are respectively located at opposing sides of the neutral point of the converter bridge arm such that the neutral point of the converter bridge arm is disposed between the two inductors; and (3) the inductor set includes a plurality of inductors, each one of the inductors disposed between two adjacent units.

5. The converter bridge arm according to claim 4, wherein, the upper or lower telescopic arm is formed by a cascading connection of a plurality of balance asymmetrical units; the cascading connection of the plurality of balance asymmetrical units includes a plurality of two adjacent units; any two adjacent units include a former unit and a latter unit; a fourth switch of the former unit or a first switch of the latter unit is replaced by a replacement diode; the replacement diode has a same polarity as a reverse conducting diode of the fourth switch of the former unit or the first switch of the latter unit being replaced.

6. The converter bridge arm according to claim 4, wherein, the upper or lower telescopic arm is formed by a cascading connection of a plurality of balance symmetrical units; the cascading connection of the plurality of balance symmetrical units includes a plurality of two adjacent units; any two adjacent units include a former unit and a latter unit; a seventh switch or an eighth switch of the former unit is replaced by a first replacement diode; the first replacement diode has a same polarity as a reverse conducting diode of the seventh switch or the eighth switch of the former unit being replaced; a fifth switch or a sixth switch of the latter unit is replaced by a second replacement diode; the second replacement diode has a same polarity as a reverse conducting diode of the fifth switch or the sixth switch of the latter unit replaced.

7. The converter bridge arm according to claim 4, wherein, the upper or lower telescopic arm is formed by a cascading connection of a plurality of balance symmetrical units; the cascading connection of the plurality of balance symmetrical units includes a plurality of two adjacent units; any two adjacent units include a former unit and a latter unit; a seventh switch or an eighth switch of the former unit is replaced by a first replacement diode; the first replacement diode has a same polarity as a reverse conducting diode of the seventh switch or the eighth switch of the former unit being replaced; optionally, a fifth switch or a sixth switch of the latter unit is replaced by a second replacement diode; the second replacement diode has a same polarity as a reverse conducting diode of the fifth switch or the sixth switch of the latter unit being replaced; and wherein a wire connection mode of the fifth switch, the sixth switch, the seventh switch and/or the eighth switch replaced by the first and/or the second replacement diode includes: a positive terminal of the fifth switch or a negative terminal of the sixth switch are connected to a second cascading connection terminal, and a positive terminal of the seventh switch or a negative terminal of the eighth switch are connected to a fourth cascading connection terminal.

8. The converter bridge arm according to claim 4, wherein, the upper or lower telescopic arm is formed by a cascading connection of a plurality of balance asymmetrical units; the cascading connection of the plurality of balance asymmetrical units includes a plurality of two adjacent units; any two adjacent units include a former unit and a latter unit; a third cascading connection terminal of the former unit is directly connected with a first cascading connection terminal of the latter unit, and a fourth cascading connection terminal of the former unit is directly connected with a second cascading connection terminal of the latter unit; and a fourth switch of the former unit or a first switch of the latter unit is omitted.

9. The converter bridge arm according to claim 4, wherein, the upper or lower telescopic arm is formed by a cascading connection of a plurality of balance symmetrical units; the cascading connection of the plurality of balance symmetrical units includes a plurality of two adjacent units; any two adjacent units include a former unit and a latter unit; a third cascading connection terminal of the former unit is directly connected with a first cascading connection terminal of the latter unit, and a fourth cascading connection terminal of the former unit is directly connected with a second cascading connection terminal of the latter unit; a seventh switch of the former unit or a fifth switch of the latter unit is omitted; and an eighth switch of the former unit or a sixth switch of the latter unit is omitted.

10. The converter bridge arm according to claim 4, wherein, between a negative terminal of the upper telescopic arm and a positive terminal of the lower telescopic arm, there are two connections: one connection is that a fourth cascading connection terminal of a lower most balance unit of the upper telescopic arm is directly connected with a second cascading connection terminal of a higher most balance unit of the lower telescopic arm; the other connection is that a third cascading connection terminal of the lower most balance unit of the upper telescopic arm is connected to a first cascading connection terminal of the higher most balance unit of the lower telescopic arm through an inductor, a resistor, or a parallel circuit of an inductor and a resistor.

11. The converter bridge arm according to claim 4, wherein, a cascading connection of a plurality of balance units includes a plurality of two adjacent units; any two adjacent units include a former unit and a latter unit; a third cascading connection terminal of the former unit is connected with a first cascading connection terminal of the latter unit through an inductor; a fourth cascading connection terminal of the former unit is connected with a second cascading connection terminal of the latter unit through an inductor (Ls2); a relationship between the inductor (Ls1) and the inductor (Ls2) is one selected from the followings:
  (1) inductor (Ls1) and inductor (Ls2) are separate inductors;
  (2) inductor (Ls1) and inductor (Ls2) are coupled inductors, and magnetic fluxes of a voltage balanced current on an energy storage capacitor (C) are mutually enhanced in the two inductors;
  (3) inductor (Ls1) and inductor (Ls2) are separate inductors, and one of the two inductors is connected with a resistor (R) in parallel; and
  (4) inductor (Ls1) and inductor (Ls2) are coupled inductors, magnetic fluxes of a voltage balanced current on an energy storage capacitor (C) are mutually enhanced in the two inductors, and one of the two inductors is connected with a resistor (R) in parallel.

12. A circuit of the converter bridge arm according to claim 4 which has a conventional converter topology, wherein: a common bridge arm is replaced by a converter bridge arm, both the upper telescopic arm and the lower telescopic arm of the converter bridge arm are formed by a cascading connection of a plurality of balance asymmetrical units, thus a configuration of the circuit is selected from one of the followings:
  (1) a bidirectional DC/DC converter includes the converter bridge arm, a positive terminal and a negative terminal of the converter bridge arm are connected with positive and negative terminals of a first direct current source respectively, and a neutral point terminal of the converter bridge arm is connected with a filter inductor in series and then connected with a positive terminal of a second direct current source, the negative terminal of the converter bridge arm is connected with a negative terminal of the second direct current source;
  (2) a single-phase or multiphase DC/AC or AC/DC converter includes one or a plurality of converter bridge arms, positive and negative terminals of the converter bridge arms are connected in parallel respectively to serve as direct current positive and negative terminals, and neutral points of the converter bridge arms are alternating current terminals for various phases; and
  (3) a single-phase or multiphase back-to-back AC/DC/AC converter includes a plurality of converter bridge arms, positive and negative terminals of the converter bridge arms are connected in parallel respectively to serve as direct current positive and negative terminals, neutral points of a first group of converter bridge arms are connected with various phases of a first alternating current source respectively, and neutral points of a second group of converter bridge arms are connected with various phases of a second alternating current source respectively.

13. The converter bridge arm according to claim 4, wherein a three-phase or multiphase converter is formed by further connection of one or a plurality of upper or lower telescopic arms in the converter bridge arm; the upper telescopic arms and the lower telescopic arms in the converter bridge arm are all formed by a cascading connection of balance symmetrical units; the cascading connection is one selected from followings:
  (1) positive and negative terminals of the converter bridge arm are connected with two phases of a three-phase power source, one end of a further connected upper or lower telescopic arm is connected with a neutral point terminal of the converter bridge arm, while the other end of the further connected upper or lower telescopic arm is connected with remaining phases of the three-phase power source, such that, a star converter is formed; a star multiphase converter is formed by further increasing the number of the telescopic arms; or
  (2) positive and negative terminals of the converter bridge arm are connected with a telescopic arm in parallel and connected with two phases of a three-phase power source respectively, a neutral point terminal of the converter bridge arm is connected with remaining phases of the three-phase power source, such that, a triangle converter is formed; and a polygon multiphase converter is formed by connecting a plurality of telescopic arms in series and then connecting these telescopic arms with the positive and negative terminals of the converter bridge arm in parallel.

14. An AC/AC converter made with the converter bridge arm according to claim 4, includes one or a plurality of converter bridge arms, and the circuit configuration is one selected from followings:
  (1) positive and negative terminals of a single converter bridge arm are an alternating current port and a neutral point terminal and the terminal (N) are another alternating current port, such that, a single-phase AC/AC variable frequency converter is formed;

(2) a multiphase alternating current port is led from positive and negative terminals of the converter bridge arms in accordance with a polygon or star connection method, and another multiphase alternating current port is led from neutral point terminals of the converter bridge arms, such that, a multiphase AC/AC variable frequency converter is formed; or (3) positive and negative terminals of a first group of three converter bridge arms are connected with various input phases respectively in accordance with a triangle or star connection method, and positive and negative terminals of a second group of three converter bridge arms are connected with various output phases respectively in accordance with a triangle or star connection method; neutral point terminals of two groups of converter bridge arms are connected with primary and secondary windings of a three-phase medium-frequency transformer respectively, such that, an electronic transformer is formed.

15. A converter control configuration based on the converter bridge arm according claim 4, wherein: terminal voltages (Us) of the units in the upper and lower telescopic arms are controlled by regulating drive pulses of the switches, so as to control terminal voltages (Uu) and (Ud) of the upper telescopic arm and the lower telescopic arm; an average current ($I_{PN}$) passing between positive and negative terminals of the converter bridge arm is controlled by dynamically regulating a sum of the voltage (Uu) and the voltage (Ud), so as to control an average value of (Uc) of all the units in the converter bridge arm; regulation for voltage potential at an neutral point terminal is achieved by complementarily regulating the voltage (Uu) and the voltage (Ud); distribution of currents ($I_P$) and ($I_N$) of the upper telescopic arm and the lower telescopic arm is changed by dynamically regulating a relative magnitude of the voltage (Uu) and the voltage (Ud), so as to balance a difference between an average value of an voltage (Uc); and differences of the voltage (Uc) on an energy storage capacitor of the units in the telescopic arms are balanced by regulating a relative magnitude of average values of a terminal voltage (Us) of the units in the upper telescopic arm and the lower telescopic arm.

16. The converter control configuration according to claim 15, wherein: the converter control configuration is one selected from followings:

(1) a configuration of identical pulse phase is configured for the units in a same telescopic arm;

(2) a configuration of phase-shift is configured for the units in a same telescopic arm;

(3) a configuration of a sinusoidal pulse width modulation (SPWM) in which carriers are equally phase-shifted based upon angle of circumference is configured for the units in a same telescopic arm, and carriers phases of the corresponding units between the upper telescopic arm and the lower telescopic arm are complemented; or (4) a configuration of a three-phase DC/AC, AC/DC converter formed by three bridge arms, six units, which are located at same positions of the bridge arms, are grouped and controlled under a sinusoidal space vector pulse width modulation (SVPWM) mode, and modulated carriers of the units in the same telescopic arm are equally phase-shifted based upon angle of circumference.

* * * * *